United States Patent
Yun et al.

(10) Patent No.: US 11,735,729 B2
(45) Date of Patent: *Aug. 22, 2023

(54) NICKEL-BASED ACTIVE MATERIAL PRECURSOR FOR LITHIUM SECONDARY BATTERY, METHOD OF PREPARING THE SAME, NICKEL-BASED ACTIVE MATERIAL FOR LITHIUM SECONDARY BATTERY FORMED THEREFROM, AND LITHIUM SECONDARY BATTERY INCLUDING POSITIVE ELECTRODE INCLUDING NICKEL-BASED ACTIVE MATERIAL

(71) Applicant: SAMSUNG SDI CO., LTD., Yongin-si (KR)

(72) Inventors: Pilsang Yun, Yongin-si (KR); Wooyoung Yang, Yongin-si (KR); Jangsuk Hyun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/817,341

(22) Filed: Aug. 3, 2022

(65) Prior Publication Data
US 2022/0376245 A1 Nov. 24, 2022

Related U.S. Application Data

(63) Continuation of application No. 16/655,068, filed on Oct. 16, 2019, now Pat. No. 11,444,281.

(30) Foreign Application Priority Data

Oct. 16, 2018 (KR) .................. 10-2018-0123269
Oct. 15, 2019 (KR) .................. 10-2019-0127697

(51) Int. Cl.
  *H01M 4/525* (2010.01)
  *H01B 1/06* (2006.01)
  (Continued)

(52) U.S. Cl.
  CPC .......... *H01M 4/525* (2013.01); *C01G 53/006* (2013.01); *H01B 1/06* (2013.01); *H01M 4/366* (2013.01);
  (Continued)

(58) Field of Classification Search
  CPC .......... H01B 1/06; H01B 1/08; H01M 4/366; H01M 4/525; C01G 53/006
  See application file for complete search history.

(56) References Cited

U.S. PATENT DOCUMENTS 8,728,666 B2  5/2014  Itou et al.
9,112,213 B2 *  8/2015  Chung .................. H01M 4/364
(Continued)

FOREIGN PATENT DOCUMENTS

CN  101657932 A  2/2010
CN  107644981 A  1/2018
(Continued)

OTHER PUBLICATIONS

Noh, Hyung-Joo et al., "Comparison of the structural and electrochemical properties of layered $Li[Ni_xCo_yMn_z]O_2$ (x=1/3, 0.5, 0.6, 0.7, 0.8 and 0.85) cathode material for lithium-ion batteries," *Journal of Power Sources* 233 (2013), pp. 121-130.
(Continued)

*Primary Examiner* — Mark Kopec
(74) *Attorney, Agent, or Firm* — Lewis Roca Rothgerber Christie LLP

(57) ABSTRACT

A nickel-based active material precursor includes a particulate structure including a core portion, an intermediate layer portion on the core portion, and a shell portion on the
(Continued)

intermediate layer portion, wherein the intermediate layer portion and the shell portion include primary particles radially arranged on the core portion, and each of the core portion and the intermediate layer portion includes a cation or anion different from that of the shell portion. The cation includes at least one selected from boron (B), magnesium (Mg), calcium (Ca), strontium (Sr), barium (Ba), titanium (Ti), vanadium (V), tungsten (W), chromium (Cr), iron (Fe), copper (Cu), zirconium (Zr), and aluminium (Al), and the anion includes at least one selected from phosphate ($PO_4$), $BO_2$, $B_4O_7$, $B_3O_5$, and F.

14 Claims, 5 Drawing Sheets
(1 of 5 Drawing Sheet(s) Filed in Color)

(51) Int. Cl.
  *C01G 53/00* (2006.01)
  *H01M 4/36* (2006.01)
  *H01M 10/0525* (2010.01)
  *H01M 4/02* (2006.01)

(52) U.S. Cl.
  CPC ..... *H01M 10/0525* (2013.01); *C01P 2004/03* (2013.01); *C01P 2004/04* (2013.01); *C01P 2006/40* (2013.01); *H01M 2004/021* (2013.01)

(56) References Cited

U.S. PATENT DOCUMENTS

| | | | |
|---|---|---|---|
| 10,581,110 B2 | 3/2020 | Kwon et al. | |
| 10,763,507 B2 | 9/2020 | You et al. | |
| 10,854,870 B2 | 12/2020 | Lee et al. | |
| 11,355,745 B2* | 6/2022 | Yun | H01M 4/366 |
| 2011/0052991 A1 | 3/2011 | Kim et al. | |
| 2014/0057176 A1* | 2/2014 | Park | H01M 4/049 |
| | | | 429/231.8 |
| 2017/0158509 A1* | 6/2017 | Kang | H01M 4/382 |
| 2018/0026267 A1 | 1/2018 | Kim et al. | |
| 2018/0048015 A1 | 2/2018 | Lee | |
| 2018/0159128 A1 | 7/2018 | Kim et al. | |
| 2018/0241040 A1 | 8/2018 | You et al. | |
| 2019/0020022 A1 | 1/2019 | Jeong et al. | |
| 2019/0386298 A1 | 12/2019 | Yun et al. | |
| 2020/0083530 A1 | 3/2020 | Yun et al. | |
| 2021/0234165 A1 | 7/2021 | Yun et al. | |

FOREIGN PATENT DOCUMENTS

| | | |
|---|---|---|
| JP | 2010/092848 A | 4/2010 |
| JP | 2018/506156 A | 3/2018 |
| JP | 2018/515884 A | 6/2018 |
| JP | 2018/525314 A | 9/2018 |
| JP | 2020/513657 A | 5/2020 |
| JP | 2020/513658 A | 5/2020 |
| KR | 10-2010-0099337 A | 9/2010 |
| KR | 10-1220677 B1 | 1/2013 |
| KR | 10-2017-0046921 A | 5/2017 |
| KR | 10-2017-0103389 A | 9/2017 |
| KR | 10-2018-0063849 A | 6/2018 |
| KR | 10-2018-0063858 A | 6/2018 |
| KR | 10-2018-0063860 | 6/2018 |
| WO | WO 2011/025080 A1 | 3/2011 |
| WO | WO 2016/175597 A1 | 11/2016 |
| WO | WO 2018/101806 A1 | 6/2018 |

OTHER PUBLICATIONS

Shizuka, Kenji et al., "Characterization of $Li_{1+y}Ni_xCo_{1-2x}Mn_xO_2$ positive active materials for lithium ion batteries," *Journal of Power Sources* 146 (2005), pp. 589-593.

EPO Extended Search Report dated Mar. 9, 2020, for corresponding European Patent Application No. 19203683.8 (6 pages).

Japanese Office Action dated Nov. 24, 2020, issued in Japanese Patent Application No. 2019-189496 (4 pages).

Chinese Office action dated Jan. 4, 2022, issued in Chinese Patent Application No. 201910982030.X with English Translation (22 pages).

Korean Office Action for KR Application No. 10-2019-0127697 dated Sep. 5, 2022, 47 pages, (No English language translation).

* cited by examiner

NICKEL-BASED ACTIVE MATERIAL PRECURSOR FOR LITHIUM SECONDARY BATTERY, METHOD OF PREPARING THE SAME, NICKEL-BASED ACTIVE MATERIAL FOR LITHIUM SECONDARY BATTERY FORMED THEREFROM, AND LITHIUM SECONDARY BATTERY INCLUDING POSITIVE ELECTRODE INCLUDING NICKEL-BASED ACTIVE MATERIAL

CROSS REFERENCE TO RELATED APPLICATIONS

This application is a continuation of U.S. patent application Ser. No. 16/655,068, filed Oct. 16, 2019, issued as U.S. Pat. No. 11,444,281, which claims priority to and the benefit of Korean Patent Application No. 10-2018-0123269, filed on Oct. 16, 2018, in the Korean Intellectual Property Office, and Korean Patent Application No. 10-2019-0127697, filed on Oct. 15, 2019, in the Korean Intellectual Property Office, the entire contents of all which are hereby incorporated by reference.

BACKGROUND

1. Field

One or more embodiments of the present disclosure relate to a nickel-based active material precursor for a lithium secondary battery, a method of preparing the nickel-based active material precursor, a nickel-based active material for a lithium secondary battery which is formed from the nickel-based active material precursor, and a lithium secondary battery including a positive electrode including the nickel-based active material.

2. Description of the Related Art

In line with the development of portable electronic devices, communication devices, and the like, there is an urgent need to develop lithium secondary batteries with high energy density. In particular, to provide a high energy density, lithium nickel manganese cobalt composite oxides having a high nickel content have recently been widely used. As positive active materials of such lithium secondary batteries, a lithium nickel manganese cobalt composite oxide, a lithium cobalt oxide, and/or the like are being used. However, when these positive active materials are used, cracks and crystal structural changes occur in primary particles as charging and discharging processes are repeated, and thus a lithium secondary battery exhibits a deteriorated long-term lifespan, increased resistance, and unsatisfactory capacity characteristics, and therefore, there is still a need for improvement.

SUMMARY

One or more aspects of the present disclosure are directed toward a nickel-based active material precursor for a lithium secondary battery which exhibits a stable crystal structure due to enhanced binding strength between a transition metal of a nickel-based active material and anions, and exhibits enhanced structural stability because problems due to cation mixing are addressed.

One or more aspects are directed toward a method of preparing the above-described nickel-based active material precursor.

One or more aspects are directed toward a nickel-based active material obtained from the above-described nickel-based active material precursor, and a lithium secondary battery exhibiting an enhanced lifespan due to the inclusion of a positive electrode including the nickel-based active material.

Additional aspects and embodiments will be set forth in part in the description which follows and, in part, will be apparent from the description, or may be learned by practice of the presented embodiments.

According to one or more embodiments, a nickel-based active material precursor for a lithium secondary battery includes a particulate structure including a core portion, an intermediate layer portion on the core portion, and a shell portion on the intermediate layer portion, wherein the intermediate layer portion and the shell portion include primary particles radially arranged on the core portion, and each of the core portion and the intermediate layer portion includes a cation or anion different from that of the shell portion, wherein the cation includes at least one selected from boron (B), magnesium (Mg), calcium (Ca), strontium (Sr), barium (Ba), titanium (Ti), vanadium (V), tungsten (W), chromium (Cr), iron (Fe), copper (Cu), zirconium (Zr), and aluminium (Al), and the anion includes at least one selected from phosphate ($PO_4$), $BO_2$, $B_4O_7$, $B_3O_5$, and F.

According to one or more embodiments, a method of preparing a nickel-based active material precursor for a lithium secondary battery includes a first process including a reaction among a complexing agent, a pH adjuster, metal raw materials for forming the nickel-based active material precursor, and a cation or anion-containing compound to form a core portion of the nickel-based active material precursor including a cation or an anion; a second process of forming, on the core portion obtained by the first process, an intermediate layer portion containing a cation or an anion; and a third process of forming, on the intermediate layer portion obtained by the second process, a shell portion containing a cation or an anion, wherein each of the core portion and the intermediate layer portion includes a cation or anion different from that of the shell portion, wherein the cation includes at least one selected from boron (B), magnesium (Mg), calcium (Ca), strontium (Sr), barium (Ba), titanium (Ti), vanadium (V), tungsten (W), chromium (Cr), iron (Fe), copper (Cu), zirconium (Zr), and aluminium (Al), and the anion includes at least one selected from phosphate ($PO_4$), $BO_2$, $B_4O_7$, $B_3O_5$, and F.

According to one or more embodiments, there is provided a nickel-based active material for a lithium secondary battery, the nickel-based active material being obtained from the nickel-based active material precursor according to the present embodiments.

According to one or more embodiments, a lithium secondary battery includes a positive electrode including the nickel-based active material according to the present embodiments.

At least some of the above and other features of the invention are set out in the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and/or other aspects will become apparent and more readily appreciated from the following description of the embodiments, taken in conjunction with the accompanying drawings in which.

DETAILED DESCRIPTION

Figure 1A:
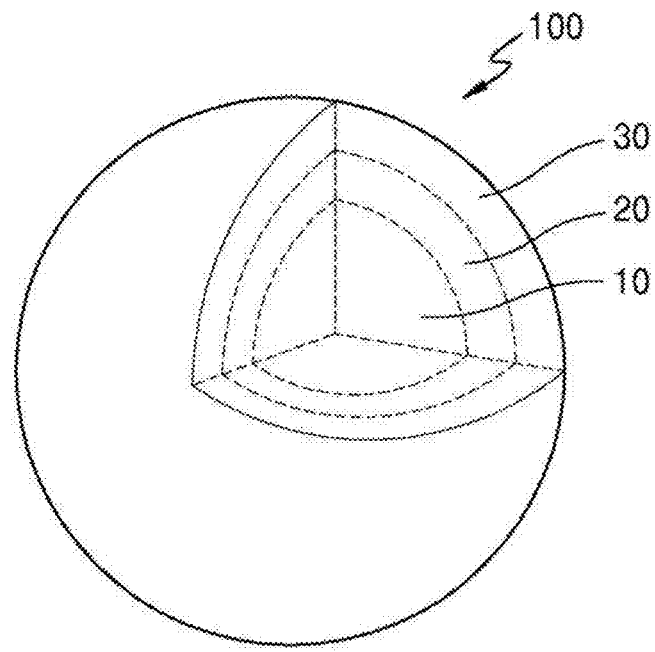
FIG. 1A is a schematic partial perspective view of a nickel-based active material precursor according to an embodiment.

Reference will now be made in more detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," "one of," and "selected from," when preceding a list of elements, modify the entire list of elements and do not modify the individual elements of the list. Further, the use of "may" when describing embodiments of the present invention refers to "one or more embodiments of the present invention."

Hereinafter, a nickel-based active material precursor for a lithium secondary battery, according to an embodiment of the present disclosure, a method of preparing the nickel-based active material precursor, a nickel-based active material formed from the nickel-based active material precursor, and a lithium secondary battery including a positive electrode including the nickel-based active material will be described in more detail. The following description is provided for illustrative purposes only and is not intended to limit the scope of the present disclosure, and the present disclosure should be defined only by the scope of the following claims.

As used herein, the term "particulate structure" refers to a structure in the form of particles formed by agglomeration of a plurality of primary particles.

As used herein, the term "cation mixing" refers to an interchange between $Li^+$ (0.76 Å) and $Ni^{2+}$ (0.72 Å) which have a similar ionic radius, i.e., movement of $Ni^{2+}$ ions to a lithium layer, thereby acting as a pillar of a layered structure. Such cation mixing blocks (or substantially reduces) lithium diffusion in the lithium layer, and thus causes a local over-potential difference in the crystal structure, resulting in an increase in instability of the crystal structure.

As used herein, the term "porosity" refers to a ratio of an area occupied by pores to a total area. For example, the porosity of a shell portion is a ratio of an area occupied by pores to a total area of the shell portion. The same definition for "porosity" is also applied to a core portion and an intermediate layer portion. The porosity can be calculated, for example, as a ratio of the area occupied by the pores to the total area of the core portion from the cross-sectional SEM image of the particulate structure.

Figure 1B:
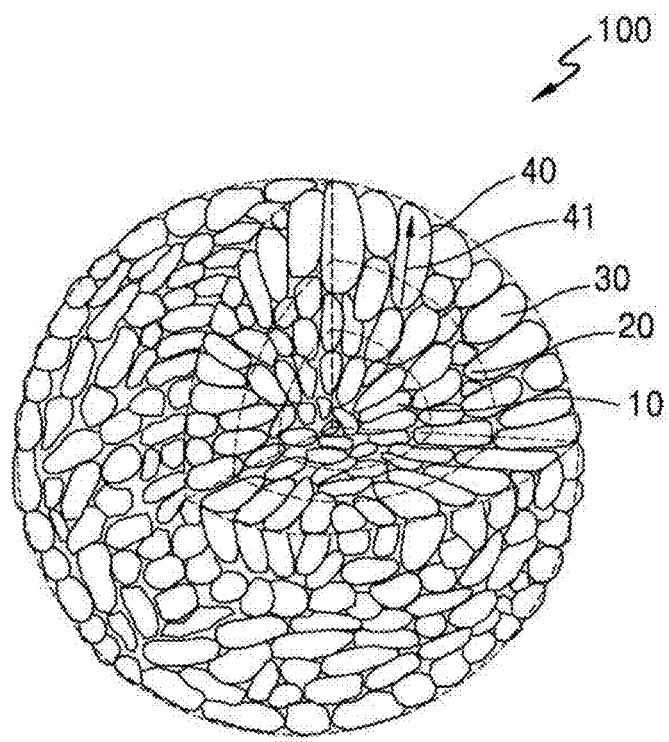
FIG. 1B is a more detailed partial perspective view of a nickel-based active material precursor according to an embodiment.

As used herein, the term "radial center" refers to the center of a particulate structure including a core portion, an intermediate layer portion including primary particles radially arranged on the core portion, and a shell portion, as illustrated in FIGS. 1A and 1B.

As used herein, the term "radial" refers to a form arranged such that major axes of primary particles included in the shell portion are perpendicular to a surface of the particulate structure or form an angle of ±30 degrees with respect to the perpendicular direction, as illustrated in FIGS. 1A and 1B.

As used herein, the term "mean particle diameter" refers to an average diameter when particles are spherical, and an average diameter (or breadth) of spheres of the same volume when the particles are non-spherical. The mean particle diameter is the mean particle diameter (D50), which is defined as the particle diameter corresponding to the cumulative diameter distribution at 50%, which represents the particle diameter below which 50% of the sample lies. The mean particle diameter may be measured using a particle size analyzer (PSA).

As used herein, the term "irregular porous pores" refers to pores that do not have a regular pore size and shape and have no uniformity. Unlike the shell portion, a core portion including irregular porous pores may include atypical particles, and these atypical particles are irregularly arranged, unlike the shell portion.

In the following drawings, like reference numerals denote like elements, and the size of each element in the drawings is exaggerated for clarity and convenience of explanation. In addition, embodiments set forth herein are provided for illustrative purposes only, and various modifications of these embodiments are possible. In addition, in a layer structure, which will be described in more detail below, the expression "above" or "on" includes not only "directly on," but also "being on" without contact between two elements.

A nickel-based active material precursor for a lithium secondary battery, according to an embodiment, includes a particulate structure including a core portion (core), an intermediate layer portion (intermediate layer) on the core portion, and a shell portion (shell) on the intermediate layer portion, in which the intermediate layer portion and the shell portion include primary particles radially arranged on the core portion, and each of the core portion and the intermediate layer portion includes a cation and/or anion different from that of the shell portion, wherein the cation includes at least one selected from boron (B), magnesium (Mg), calcium (Ca), strontium (Sr), barium (Ba), titanium (Ti), vanadium (V), tungsten (W), chromium (Cr), iron (Fe), copper (Cu), zirconium (Zr), and aluminium (Al), and the anion includes at least one selected from phosphate ($PO_4$), $BO_2$, $B_4O_7$, $B_3O_5$, and F.

Referring to FIGS. 1A and 1B, a nickel-based active material precursor for a lithium secondary battery includes a particulate structure 100 including a core portion 10, an intermediate layer portion 20 on the core portion 10, and a shell portion 30 on the intermediate layer portion 20, in which the intermediate layer portion 20 and the shell portion 30 include primary particles 40 radially arranged on the core portion 10, and the core portion 10 and the intermediate layer portion 20, and the shell portion 30 include different cations and/or anions, wherein the cation includes at least one selected from B, Mg, Ca, Sr, Ba, Ti, V, W, Cr, Fe, Cu, Zr, and Al, and the anion includes at least one selected from $PO_4$, $BO_2$, $B_4O_7$, $B_3O_5$, and F.

Referring to FIGS. 1A and 1B, the particulate structure 100 has a structure in which the core portion 10, the intermediate layer portion 20, and the shell portion 30 are sequentially stacked. The particulate structure 100 is, for example, a secondary particle. The core portion 10, which is a porous core portion, reduces a lithium diffusion distance in a nickel-based active material obtained from the nickel-based active material precursor. The intermediate layer portion 20 has a high density due to radial arrangement of the primary particles 40. In the shell portion 30, the primary particles 40 are also radially arranged. In the particulate structure 100, the primary particles 40 are radially arranged on the core portion 10 to form the intermediate layer portion 20 and/or the shell portion 30, such that stress applied to the primary particles 40 during charging and discharging is reduced. Accordingly, volume changes of the primary particles 40 are effectively (suitably) accommodated. Thus, cracks due to a volume change of a nickel-based active material prepared from the nickel-based active material precursor during charging and discharging are suppressed or reduced. In one or more embodiments, each of the core portion 10 and the intermediate layer portion 20 includes cations and/or anions different from that of the shell portion 30.

The cations are, for example, metal cations having an ionic radius similar to but different from that of nickel cations and/or having an increased binding affinity with oxygen. Since the core portion 10, the intermediate layer portion 20, and/or the shell portion 30 include(s) these metal cations, cation mixing is suppressed (or reduced) in the crystal lattice, resulting in suppression (or reduction) of the elution of nickel ions, and accordingly, the structural stability of a portion including the cations is enhanced. For example, metal cations having an ionic radius similar to but different from that of nickel cations are substituted or doped in lithium cation sites or vacancies of the crystal lattice, thereby partially blocking the transfer path of $Ni^{2+}$ in the lithium layer or preventing the transfer of $Ni^{2+}$ by repulsion, thus resulting in reduced cation mixing. In addition, because the shell portion 30 includes such metal cations, a transition metal layer is stabilized, and thus the volume change of crystals due to charging and discharging and the transfer of nickel cations are suppressed (or reduced), thus resulting in suppressed (or reduced) cation mixing. In addition, the generation of a NiO phase (a rock salt phase) on a surface during synthesis of a positive active material is suppressed or reduced, and deintercalation of oxygen is suppressed or reduced, and thus the positive active material becomes more stable.

The anions are, for example, anions having a higher electronegativity than oxygen. Since the core portion 10, the intermediate layer portion 20, and/or the shell portion 30 include(s) anions having such high electronegativity, binding strength between the transition metal and the anions in the crystal lattice is enhanced. When the binding strength between the transition metal and the anions is increased, a structural change of the active material and consequent deintercalation of oxygen are suppressed or reduced, and accordingly, the structural stability of the positive active material is enhanced. For example, the instability of an anion layer due to lithium entry during charging and discharging is reduced, and gas generation due to oxygen release is suppressed or reduced. Accordingly, a nickel-based active material prepared from such nickel-based active material precursor exhibits both a high discharge capacity and excellent (or suitable) structural stability.

Referring to FIGS. 1A and 1B, the shell portion 30 includes, for example, at least one cation selected from B, Mg, Ca, Sr, Ba, Ti, V, W, Cr, Fe, Cu, Zr, and Al. The amount of the cation(s) included in the nickel-based active material precursor is, for example, 0.9 mol % or less, 0.7 mol % or less, 0.5 mol % or less, 0.3 mol % or less, or 0.28 mol % or less with respect to a total amount of the nickel-based active material precursor. For example, the amount of the cation(s) included in the nickel-based active material precursor is in a range of about 0.0001 mol % to about 0.9 mol %, about 0.001 mol % to about 0.7 mol %, about 0.001 mol % to about 0.5 mol %, about 0.001 mol % to about 0.3 mol %, or about 0.001 mol % to about 0.28 mol % with respect to the total amount of the nickel-based active material precursor. When the amount of the cation(s) is too large, doping in the shell portion is difficult such that the amount of impurities increases, and the porosity of the shell portion is further increased. Accordingly, a lithium battery including a nickel-based active material obtained from such a porous nickel-based active material precursor exhibits reduced volume capacity and deteriorated cycle characteristics.

Referring to FIGS. 1A and 1B, the core portion 10 and the intermediate layer portion 20 include, for example, at least one anion selected from $PO_4$, $BO_2$, $B_4O_7$, $B_3O_5$, and F. The amount of the anions included in the nickel-based active material precursor is, for example, 0.06 mol % or less, 0.05 mol % or less, 0.04 mol % or less, or 0.03 mol % or less with respect to the total amount of the nickel-based active material precursor. The amount of the anions included in the nickel-based active material precursor is in a range of, for example, about 0.0001 mol % to about 0.06 mol %, about 0.001 mol % to about 0.05 mol %, about 0.005 mol % to about 0.04 mol %, or about 0.01 mol % to about 0.03 mol % with respect to the total amount of the nickel-based active material precursor.

The amount of the cation(s) included in the shell portion 30 of the nickel-based active material precursor is, for example, 2.0 mol % or less, 1.8 mol % or less, 1.6 mol % or less, 1.4 mol % or less, 1.33 mol % or less, or 0.41 mol % or less with respect to the total amount of the shell portion 30. For example, the amount of the cation(s) included in the shell portion 30 of the nickel-based active material precursor is in a range of about 0.0001 mol % to about 2.0 mol %, about 0.001 mol % to about 1.8 mol %, about 0.001 mol % to about 1.6 mol %, about 0.001 mol % to about 1.4 mol %, about 0.001 mol % to about 1.33 mol %, or about 0.001 mol % to about 0.41 mol % with respect to the total amount of the shell portion 30.

A total amount of the anions included in the core portion 10 and the intermediate layer portion 20 of the nickel-based active material precursor is, for example, 1.0 mol % or less, 0.8 mol % or less, 0.6 mol % or less, 0.4 mol % or less, or 0.18 mol % or less with respect to a total amount of the core portion 10 and the intermediate layer portion 20. The total amount of the anions included in the core portion 10 and the intermediate layer portion 20 of the nickel-based active material precursor is in a range of about 0.0001 mol % to about 1.0 mol %, about 0.001 mol % to about 0.8 mol %, about 0.001 mol % to about 0.6 mol %, about 0.001 mol % to about 0.4 mol %, or about 0.001 mol % to 0.18 mol % with respect to the total amount of the core portion 10 and the intermediate layer portion 20.

Because the whole nickel-based active material precursor, the core portion 10 of the nickel-based active material precursor, the intermediate layer portion 20 of the nickel-based active material precursor, and/or the shell portion 30 of the nickel-based active material precursor include cations and/or anions within the above-described amount ranges, the structural stability of a nickel-based active material prepared from the nickel-based active material precursor is further enhanced.

Referring to FIGS. 1A and 1B, in the particulate structure 100, a first pore distribution is formed such that the core portion 10 has a higher porosity than that of the intermediate layer portion 20 and the shell portion 30, or a second pore distribution is formed such that the core portion 10 and the shell portion 30 have a higher porosity than that of the intermediate layer portion 20.

A nickel-based active material precursor having the first pore distribution will now be described in more detail.

Figure 2A:
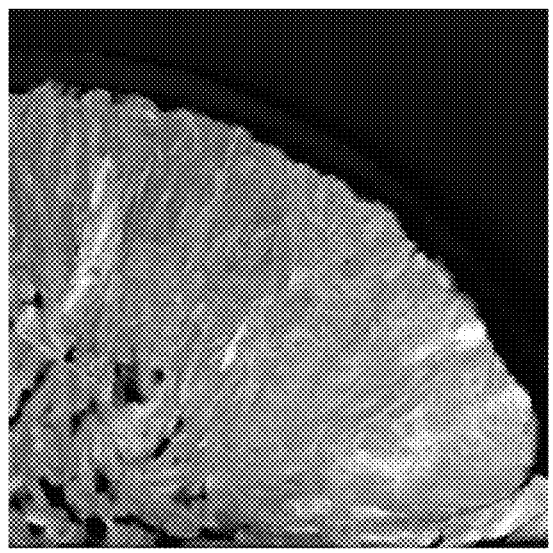
FIGS. 2A and 2B are scanning electron microscope (SEM) images respectively showing cross-sections of nickel-based active materials prepared according to Examples 1 and 2.

FIG. 2A is an image showing the cross-section of a nickel-based active material that is prepared from a nickel-based active material precursor having the first pore distribution and has substantially the same pore distribution as that of the nickel-based active material precursor having the first pore distribution.

Referring to FIGS. 1A and 1B, for example, the porosity of the intermediate layer portion 20 and the shell portion 30 is lower than the porosity of the core portion 10, which is porous. Thus, the intermediate layer portion 20 and the shell portion 30 have a higher density than that of the core portion 10, which is porous. When the particulate structure 100 has such a density gradient, a surface area where lithium diffusion occurs is increased and diffusion is facilitated, and thus a nickel-based active material prepared from the nickel-based active material precursor exhibits enhanced rate capability during charging and discharging. In addition, a lithium secondary battery including such nickel-based active material exhibits enhanced lifespan characteristics. For example, the porosity of the core portion 10, the intermediate layer portion 20, and the shell portion 30 may be sequentially reduced.

Referring to FIGS. 1A and 1B, the shell portion 30 forms open pores by controlling the density thereof, and an electrolytic solution permeates through the open pores, thereby increasing a diffusion coefficient of lithium ions. Since the particulate structure 100 includes the shell portion 30 having such an increased diffusion coefficient, a surface area where lithium diffusion occurs is increased and diffusion is facilitated, and thus a nickel-based active material prepared from the nickel-based active material precursor exhibits enhanced rate capability during charging and discharging. In addition, a lithium secondary battery including such nickel-based active material exhibits enhanced lifespan characteristics.

Referring to FIGS. 1A and 1B, the core portion 10 is a region corresponding to, from the center of the particulate structure 100, 40 length % to 70 length % of a total distance between the center and the outermost surface of the particulate structure 100. In some embodiments, the core portion 10 refers to the remaining region excluding a region within, for example, 3 μm from the surface of the particulate structure 100. The core portion 10 has a thickness (when measured from the center) of, for example, about 2 μm to about 5 μm, for example, about 2.5 μm to about 3.5 μm. The core portion 10 has a porosity of, for example, about 15% to about 20%. The pore size of the core portion 10 may be greater than the pore size of the shell portion 30 which will be described below, and may be in a range of about 150 nm to about 1 μm, for example, about 150 nm to about 550 nm, for example, about 200 nm to about 500 nm. The volume of the core portion 10 is, for example, 15% or less or 10% or less of a total volume of the particulate structure 100. When the core portion 10 has such region, porosity, volume, and/or pore size, the structural stability of a nickel-based active material prepared from the nickel-based active material precursor is further enhanced.

Referring to FIGS. 1A and 1B, the shell portion 30 is a region corresponding to, from the outermost surface of the particulate structure 100, 5 length % to 20 length % of a total distance between the center and the outermost surface of the particulate structure 100. In some embodiments, the shell portion 30 refers to an area within, for example, 2 μm from the outermost surface of the particulate structure 100. The shell portion 30 has a thickness of about 1 μm to about 3 μm, for example, about 1.5 μm to about 2 μm. The porosity of the shell portion 30 is, for example, 5% or less, 2% or less, for example, in a range of about 0.1% to about 2%. The pore size of the shell portion 30 is less than 150 nm, for example, 100 nm or less, for example, in a range of about 20 nm to about 90 nm. The volume of the shell portion 30 is, for example, 50% or more, 60% or more, or 70% or more of the total volume of the particulate structure 100. The volume of the shell portion 30 is in a range of, for example, about 50% to about 80%, or about 60% to 75% of the total volume of the particulate structure 100. When the shell portion 30 has such region, porosity, volume, and/or pore size, the structural stability of a nickel-based active material prepared from the nickel-based active material precursor is further enhanced.

Referring to FIGS. 1A and 1B, the intermediate layer portion 20 is the remaining area except for the core portion 10 and the shell portion 30. The intermediate layer portion 20 has a thickness of about 1 μm to about 3 μm, for example, about 1.4 μm to about 2 μm. The porosity of the intermediate layer portion 20 is in a range of, for example, about 0.1% to about 14.8%, about 2% to about 14.8%, about 5% to about 14.8%, or about 10% to about 14.8%. The pore size of the intermediate layer portion 20 is less than 150 nm, for example, 100 nm or less, for example, in a range of about 20 nm to about 90 nm. The volume of the intermediate layer portion 20 is in a range of, for example, about 20% to about 35% of the total volume of the particulate structure 100. When the intermediate layer portion 20 has such region, porosity, volume, and/or pore size, the structural stability of a nickel-based active material prepared from the nickel-based active material precursor is further enhanced.

A nickel-based active material precursor having the second pore distribution will now be described in more detail.

Figure 2B:
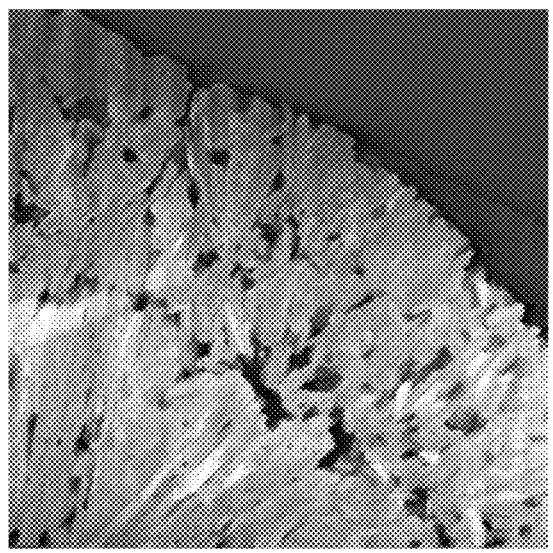
Figure 3A:
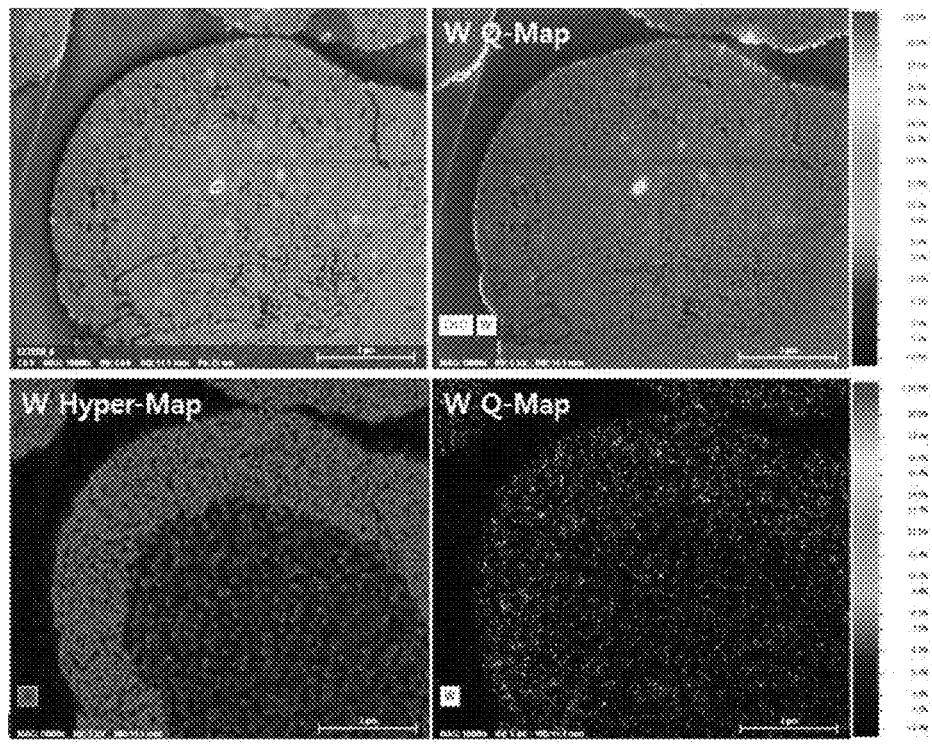
FIGS. 3A and 3B are a high-angle annular dark-field scanning transmission electron microscope (HAADF-STEM) image and an energy-dispersive X-ray spectroscopy (EDS) image showing cross-sections of nickel-based active materials prepared according to Example 2 and Comparative Example 2, respectively.

FIGS. 2B and 3A are images showing the cross-section of a nickel-based active material prepared from a nickel-based active material precursor having the second pore distribution and having substantially the same pore distribution as that of the nickel-based active material precursor having the second pore distribution.

Referring to FIGS. 1A and 1B, in the particulate structure 100 having the second pore distribution, for example, the porosity of each of the core portion 10 and the shell portion 30 is higher than that of the intermediate layer portion 20. Thus, the core portion 10 and the shell portion 30 each have a lower density than that of the intermediate layer portion 20. When the particulate structure 100 has such density gradient, a surface area where lithium diffusion occurs is increased and diffusion is facilitated, and thus the nickel-based active material prepared from the nickel-based active material precursor exhibits enhanced rate capability during charging and discharging. In addition, a lithium secondary battery including such nickel-based active material exhibits enhanced lifespan characteristics.

Referring to FIGS. 1A and 1B, the shell portion 30 of the nickel-based active material precursor having the second pore distribution is an area (and/or volume) corresponding to, from the outermost surface of the particulate structure 100, 5 length % to 20 length % of a total distance between the center and outermost surface of the particulate structure 100. In some embodiments, the shell portion 30 refers to an area (and/or volume) within, for example, 2 μm from the outermost surface of the particulate structure 100. The shell portion 30 has a thickness of, for example, about 1 μm to about 3 μm, for example, about 1.5 μm to about 2 μm. The shell portion 30 has a porosity of, for example, about 15% to about 20%. The pore size of the shell portion 30 is in a range of about 150 nm to about 1 μm, for example, about 150 nm to about 550 nm, for example, about 200 nm to about 500 nm. The volume of the shell portion 30 is, for example, 50% or more, 60% or more, or 70% or more of the total volume of the particulate structure 100. The volume of the shell portion 30 is in a range of, for example, about 50% to about 80%, or about 60% to about 75% of the total volume of the particulate structure 100. When the shell portion 30 has such structure, porosity, and/or pore size, the structural stability of a nickel-based active material prepared from the nickel-based active material precursor is further enhanced.

The core portion 10 and the intermediate layer portion 20 of the nickel-based active material precursor having the second pore distribution have the same configurations as those of the core portion 10 and the intermediate layer portion 20 of the above-described nickel-based active material precursor having the first pore distribution.

Referring to FIGS. 1A, 1B, and 2B, the primary particles 40 are radially arranged in the shell portion 30, and thus pores are formed between the radially arranged primary particles 40, and these pores are also radially arranged, thereby forming open pores extending from the inside of a precursor particle to the surface of the precursor particle. By including the open pores in the shell portion 30, entry and exit of lithium ions to and from a nickel-based active material prepared from the nickel-based active material precursor are further facilitated, and thus a lithium battery including the nickel-based active material exhibits enhanced rate capability.

Referring to FIGS. 1A and 1B, a secondary particle included in the nickel-based active material precursor may be in the form of a single particulate structure 100. The secondary particles may have a mean particle diameter of, for example, about 5 μm to about 25 μm, or about 9 μm to about 20 μm. When the secondary particles have a mean particle diameter within the above-described range, the structural stability of a nickel-based active material prepared from the nickel-based active material precursor is further enhanced.

Referring to FIG. 1B, in an example embodiment, the primary particle 40 is a non-spherical particle having a minor axis and a major axis. The minor axis is an axis connecting points having the smallest distance between opposite ends of the primary particle 40, and the major axis is an axis connecting points having the greatest distance between opposite ends of the primary particle 40. A ratio of the minor axis to the major axis of the primary particle 40 is in a range of, for example, about 1:2 to about 1:20, about 1:3 to about 1:20, or about 1:5 to about 1:15. When the primary particle 40 has a ratio of the minor axis to the major axis within the above-described range, use of lithium ions in a nickel-based active material obtained from the nickel-based active material precursor is further facilitated.

Referring to FIG. 1B, the primary particles 40, which are non-spherical particles, include, for example, plate particles. Plate particles are particles having two opposing surfaces, wherein a surface length (length) is larger than a thickness (which is a distance between the two surfaces). The surface length of the plate particles is the larger of the two dimensions (e.g., length and width) defining the surface. The two dimensions defining the surface can be different from or identical to each other, and are each larger than the thickness. The thickness of the plate particle is the length of the minor axis, and the surface length of the plate particle is the length of the major axis. The surfaces of the plate particles may each be in the form of a polygon such as a trigon, a tetragon, a pentagon, a hexagon, or the like, a circular shape, or an oval shape, but are not limited thereto, and the surfaces of the plate particles may have any suitable form. Examples of the plate particles include nanodiscs, tetragonal nanosheets, pentagonal nanosheets, and hexagonal nanosheets, without limitation. Particular forms of the plate particles vary depending on specific conditions under which secondary particles are prepared. The two opposing surfaces of the plate particle may not be parallel to each other, an angle between a surface and a side surface may be variously changed, edges of the surface and the side surface may have a rounded shape, and each of the surface and the side surface may have a planar or curved shape. The major axes 41 of the plate particles are radially arranged on the core portion 10 of the particulate structure 100, thereby forming the intermediate layer portion 20 and/or the shell portion 30. A length ratio of the minor axis to the major axis of the plate particle is in a range of, for example, about 1:2 to about 1:20, about 1:3 to about 1:20, or about 1:5 to about 1:15. In an example embodiment, the plate particles each have an average thickness of about 100 nm to about 250 nm, or about 100 nm to about 200 nm, and have an average surface length of about 250 nm to about 1,100 nm, or about 300 nm to about 1,000 nm. The average surface length of the plate particles is 2 times to 10 times the particle's average thickness. When the plate particles have thickness, average surface length, and a ratio thereof within the above-described ranges, radial arrangement of the plate particles on a porous core portion is more suitably facilitated and consequently, the structural stability of a nickel-based active material obtained from the nickel-based active material precursor is further enhanced.

Referring to FIGS. 1A and 1B, secondary particles in the form of the particulate structure 100 included in the nickel-based active material precursor have a specific surface area of about 4 m$^2$/g to about 10 m$^2$/g. The specific surface area may be measured by a BET method. For example, a BET 6-point method may be used according to a nitrogen gas adsorption method by using a porosimetry analyzer (Belsorp-II Mini, Bell Japan Inc.). When the nickel-based active material precursor has a relatively large specific surface area within the above range, diffusion of lithium ions in a nickel-based active material prepared from the nickel-based active material precursor is more facilitated.

The nickel-based active material precursor is, for example, a compound represented by Formula 1 or 2 below:

$$Ni_{1-x-y-z}Co_xMn_yM_z(OH)_{2-\alpha}X_\alpha \qquad \text{Formula 1}$$

$$Ni_{1-x-y-z}Co_xAl_yM_z(OH)_{2-\alpha}X_\alpha, \qquad \text{Formula 2}$$

wherein, in Formula 1 and 2, M is an element selected from B, Mg, Ca, Sr, Ba, Ti, V, W, Cr, Fe, Cu, Zr, and Al, $x \le (1-x-y-z)$, $y \le (1-x-y-z)$, $0<x<1$, $0 \le y<1$, $0<z \le 0.01$, and $0<\alpha \le 0.01$, and X is at least one selected from $PO_4$, $BO_2$, $B_4O_7$, $B_3O_5$, and F. In Formula 1, for example, $0<x \le 0.33$, $0<z \le 0.01$, $0.33 \le (1-x-y-z) \le 0.97$, and $0<\alpha \le 0.01$. In Formula 1, for example, $0<x \le 0.33$, $0<y \le 0.33$, $0<z \le 0.009$, $0.33 \le (1-x-y-z) \le 0.97$, and $0<\alpha \le 0.0013$. The content of nickel in the nickel-based active material precursor may be in a range of, for example, about 33 mol % to about 97 mol %, about 33 mol % to about 95 mol %, for example, about 50 mol % to about 90 mol %, for example, about 60 mol % to about 85 mol %, with respect to a total amount of transition metals. The total amount of transition metals refers to a total amount of nickel, cobalt, and manganese in Formula 1 and a total amount of nickel, cobalt, and aluminium in Formula 2.

The content of nickel in the nickel-based active material precursor may range from about 33 mol % to about 97 mol % with respect to the total amount of transition metals, and may be higher than the content of manganese and the content of cobalt.

The metal hydroxide of Formulae 1 or 2 is, for example, $(Ni_{0.6}Co_{0.2}Mn_{0.2})_{1-a}M_a(OH)_{2-\alpha}X_\alpha$, $(Ni_{0.5}Co_{0.2}Mn_{0.3})_{1-a}M_a(OH)_{2-\alpha}X_\alpha$, $(Ni_{0.7}Co_{0.15}Mn_{0.15})_{1-a}M_a(OH)_{2-\alpha}X_\alpha$, $(Ni_{0.85}Co_{0.1}Al_{0.05})_{1-a}M_a(OH)_{2-\alpha}X_\alpha$, or $(Ni_{0.91}Co_{0.06}Mn_{0.03})_{1-a}M_a(OH)_{2-\alpha}X_\alpha$, wherein $0<a<0.01$ and $0<\alpha \le 0.01$, M is at least one element selected from B, Mg, Ca, Sr, Ba, Ti, V, W, Cr, Fe, Cu, Zr, and Al, and X is at least one selected from $PO_4$, $BO_2$, $B_4O_7$, $B_3O_5$, and F. For example, $0<a<0.009$ and $0<\alpha \le 0.0013$.

A method of preparing a nickel-based active material precursor, according to an embodiment, includes: a first process of allowing a reaction to occur among a complexing agent, a pH adjuster, metal raw materials for forming a nickel-based active material precursor, and a cation or anion-containing compound to form a core portion of a nickel-based active material precursor including a cation and/or an anion; a second process of forming, on the core portion obtained by the first process, an intermediate layer portion containing a cation or an anion; and a third process of forming, on the intermediate layer portion obtained by the second process, a shell portion containing a cation or an anion, wherein each of the core portion and the intermediate layer portion includes a cation or anion different from that of the shell portion, the cation includes at least one selected from B, Mg, Ca, Sr, Ba, Ti, V, W, Cr, Fe, Cu, Zr and Al, and the anion includes at least one selected from $PO_4$, $BO_2$, $B_4O_7$, $B_3O_5$, and F.

In the first, second and third processes, a reaction temperature is in a range of about 40° C. to about 60° C., a stirring power is in a range of about 0.1 kW/m³ to about 6.0 kW/m³, pH ranges from about 10 to about 12, and the amount of the complexing agent included in the reaction mixture is in a range of about 0.1 M to about 0.6 M, for example, about 0.3 M to about 0.6 M. Within the above-described ranges, a nickel-based active material precursor that more satisfactorily (suitably) matches the above-described structure may be obtained.

The feed rate of the metal raw materials is higher in the second process than in the first process, and the feed rate of the metal raw materials in the third process may be maintained at the same level as that in the first process. That is, the feed rate of the metal raw materials in the first process may be the same as that of the metal raw materials in the third process, and the feed rate of the metal raw materials in the second process may be greater than in the first and third processes. For example, the feed rate of the metal raw materials in the second process may be increased to 10% to 50% based on the feed rate in the first process, and the feed rate of the metal raw materials in the third process may be the same as that in the first process. As such, by adjusting the feed rate of the metal raw materials, a nickel-based active material precursor that more satisfactorily (suitably) matches the above-described structure may be obtained.

The stirring power of the first process is the highest, and the stirring power of the third process is the lowest, and the stirring power of the second process may have a stirring power of a level between the stirring power of the first process and the stirring power of the third process. When the core portion and the intermediate layer portion include cations and/or anions different from those of the shell portion, a nickel-based active material precursor having the above-described novel structure is obtained. For example, the stirring power of the reaction mixture in a reactor may be lower in the second process than in the first process, and the stirring power of the reaction mixture in a reactor may be lower in the third process than in the second process. The stirring power of the first process may be in a range of about 1 kW/m³ to about 4 kW/m³, the stirring power of the second process may be in a range of about 1 kW/m³ to about 3 kW/m³, and the stirring power of the third process may be in a range of about 1 kW/m³ to about 2 kW/m³. The stirring power of the first process, the second process, and the third process may be sequentially reduced, thereby obtaining a nickel-based active material precursor that more satisfactorily (suitably) matches the above-described structure. In addition, in the precursor preparation method, the stirring rate of the reaction mixture in a reactor in the first process, the second process, and the third process may be sequentially reduced. As such, by a sequential reduction in the stirring rates of the first, second and third processes, a nickel-based active material precursor that more satisfactorily (suitably) matches the above-described structure may be obtained.

The pH of the reaction mixture of the second process may be the same as that of the reaction mixture of the third process, and the pH of the reaction mixture of each of the second and third processes may be lower than that of the reaction mixture of the first process. For example, the pH of the reaction mixture in the second and third processes may be about 0.5 to about 1.6, about 1.1 to about 1.6, or about 1.2 to about 1.5 less than that of the reaction mixture of the first process at a reaction temperature of 50° C. In one or more embodiments, as the first process, the second process, and the third process proceed, the pH of the reaction mixture in a reactor may be sequentially reduced. For example, the pH of the reaction mixture of the second process may be about 0.55 to about 0.85 lower than that of the reaction mixture of the first process at a reaction temperature of 50° C., and the pH of the reaction mixture of the third process may be about 0.35 to about 0.55 lower than that of the reaction mixture of the second process. In one or more embodiments, as the first process, the second process, and the third process proceed, the pH of the reaction mixture in a reactor may be maintained at the same level. For example, the pH of the reaction mixture of the first to third processes may be in a range of about 10 to about 11.5 at a reaction temperature of 50° C. As such, by adjusting the pH of the reaction mixture according to the present embodiments, a nickel-based active material precursor that more satisfactorily (suitably) matches the above-described structure may be obtained.

The concentration of the complexing agent may be sequentially increased as the first process, the second process, and the third process proceed. For example, the concentration of the complexing agent included in the reaction mixture of the second process may be increased compared to that of the complexing agent included in the reaction mixture of the first process, and the concentration of the complexing agent included in the reaction mixture of the third process may be increased compared to that of the complexing agent included in the reaction mixture of the second process. For example, the concentration of the complexing agent included in the reaction mixture of the second process may be increased by about 0.05 M to about 0.5 M compared to that of the complexing agent included in the reaction mixture of the first process, and the concentration of the complexing agent included in the reaction mixture of the third process may be increased by about 0.05 M to about 0.5 M compared to that of the complexing agent included in the reaction mixture of the second process. In one or more embodiments, as the first process, the second process, and the third process proceed, the concentration of the complexing agent included in the reaction mixture may be maintained at the same level. For example, the concentration of the complexing agent included in the reaction mixture of each of the first to third processes may be in a range of about 0.5 M to about 0.6 M.

In the first process, a complexing agent, a pH adjuster, metal raw materials for forming the nickel-based active material precursor, and a cation or anion-containing compound are allowed to react to form and grow a core portion of the nickel-based active material precursor containing the cation and/or anion. In the first process, a growth rate of precursor seed particles may be about 0.32±0.05 µm/hr. In the first process, the stirring power of the reaction mixture may be in a range of about 1.2 kW/m$^3$ to about 4 kW/m$^3$, for example, 3.0 kW/m$^3$, and the pH of the reaction mixture may be in a range of about 10.5 to about 12. For example, in the first process, the feed rate of the metal raw materials may be in a range of about 1.0 ml/min to about 10.0 ml/min, for example, 4.3 ml/min, and the feed rate of the complexing agent may be about 0.1 to about 0.6 times, for example, 0.15 times a molar feed rate of the metal raw materials. For example, in the first process, the feed rate of the cation-containing compound or the anion-containing compound is in a range of about 1.0 ml/min to about 3.0 ml/min, for example, 1.6 ml/min. The temperature of the reaction mixture is in a range of, for example, 40° C. to 60° C., for example, 50° C., and the reaction mixture has a pH of about 11 to about 12, for example, about 11.0 to about 11.5.

In the second process, reaction conditions are changed and an intermediate layer portion containing a cation or an anion is formed and grown on the core portion using a cation or anion-containing compound. In the second process, a precursor seed has the same growth rate or a growth rate increased by 20% or greater, compared to that of a precursor seed of the first process. The feed rate of the metal raw materials in the second process may be 1.2 times or more, for example, about 1.2 times to about 2.5 times that of the metal raw materials of the first process, and the concentration of the complexing agent in the reaction mixture may be 0.05 M or more, for example, about 0.05 M to about 0.15 M higher than that of the complexing agent in the first process. In the second process, the stirring power of the reaction mixture may be in a range of about 1 kW/m$^3$ to about 3 kW/m$^3$, for example, 2.5 kW/m$^3$, and the reaction mixture may have a pH of about 10 to about 11. For example, in the second process, the concentration of the complexing agent is in a range of, for example, about 0.3 M to about 0.55 M, the feed rate of the metal raw materials is in a range of about 1 ml/min to about 10 ml/min, and the feed rate of the complexing agent is in a range of about 0.1 ml/min to about 2 ml/min. For example, the feed rate of the cation-containing compound or the anion-containing compound in the second process is in a range of about 1.0 ml/min to about 3.0 ml/min, for example, 2.0 ml/min.

In the third process, reaction conditions are changed and a shell portion containing a cation or an anion is formed and grown on the intermediate layer portion obtained by the second process, using a cation or anion-containing compound, thereby obtaining a nickel-based active material precursor for a lithium secondary battery. When the mean particle diameter (D50) of precursor particles in the second process reaches about 9 µm to about 12 µm, for example, about 12 µm, the third process proceeds. As compared to the growth rate of the precursor particles in the second process, the growth rate of the precursor particles in the third process may be increased by 2 times or more, for example, 3 times or more. To this end, the reaction product in a reactor, having gone through the second process, may be partially removed to dilute the concentration of the reaction product in the reactor. The product removed from the inside of the reactor may be used in another reactor. The feed rate of the metal raw materials in the third process may be 0.5 times or more, for example, about 0.5 times to about 0.9 times that of the metal raw materials of the second process, and the concentration of the complexing agent in the reaction mixture may be higher by 0.05 M or more, for example, about 0.05 M to about 0.15 M, as compared to that of the complexing agent in the second process. In the third process, the precipitate is grown to thereby obtain a nickel-based active material precursor. In the third process, the stirring power of the reaction mixture may be in a range of about 1 kW/m$^3$ to about 3 kW/m$^3$, for example, 2.0 kW/m$^3$, and the reaction mixture may have a pH of about 10 to about 11. For example, in the third process, the concentration of the complexing agent is in a range of, for example, about 0.3 M to about 0.6 M, the feed rate of the metal raw materials is in a range of about 2 ml/min to about 10 ml/min, and the feed rate of the complexing agent is in a range of about 0.1 ml/min to about 2 ml/min. For example, the feed rate of the cation-containing compound or the anion-containing compound in the third process is in a range of about 1.0 ml/min to about 3.0 ml/min, for example, 1.6 ml/min.

In the precursor preparation method, by considering the composition of the nickel-based active material precursor, metal precursors corresponding to the nickel-based active material precursor may be used as metal raw materials. Examples of metal raw materials include, but are not limited to, metal carbonates, metal sulfates, metal nitrates, metal chlorides, metal fluorides, and the like, and any suitable metal precursor may be used. For example, as a Ni-containing compound, at least one selected from nickel sulfate, nickel nitrate, nickel chloride, and nickel fluoride may be used. For example, as a Co-containing compound, at least one selected from cobalt sulfate, cobalt nitrate, cobalt chloride, and cobalt fluoride may be used. For example, as a Mn-containing compound, at least one selected from manganese sulfate, manganese nitrate, manganese chloride, and manganese fluoride may be used. For example, an Al-containing compound, at least one selected from aluminium sulfate, aluminium nitrate, aluminium chloride, and aluminium fluoride may be used. For example, as a metal (M)-containing compound, at least one selected from a sulfate, a nitrate, a chloride salt, and a fluoride salt of the metal (M) may be used.

To control the growth rate of nickel-based active material precursor particles, the feed rate of metal raw materials for growing the particles may be increased by about 15% to about 35%, for example, about 25% in the second process, as compared to the first process, and may be reduced by about 20% to about 35%, for example, about 33% in the third process, as compared to the second process. In addition, the feed rate of the complexing agent such as ammonia water in the second process may be increased by about 10% to about 30%, for example, about 20% with respect to the feed rate of the complexing agent such as ammonia water in the first process, thereby increasing the density of the particles.

The concentration of the cation-containing compound or the anion-containing compound may be adjusted such that the content of cations or anions in the nickel-based active material precursor, which is the resulting product, is in a range of about 0.01 mol % to about 1.0 mol %. According to one or more embodiments, the anion-containing compound is used in forming a core and an intermediate layer, and the cation-containing compound is used in forming a shell.

As the cation-containing compound, a cation-containing salt or base such as a chloride, a sulfate, an oxalate, a carbonate, a hydroxide, a halide and/or the like that contains at least one selected from B, Mg, Ca, Sr, Ba, Ti, V, W, Cr, Fe, Cu, Zr, and Al may be used. In some embodiments, a cation-containing oxide may be used. For example, tungsten oxide ($WO_2$) and/or the like may be used.

As the anion-containing compound, a phosphate, an oxide, and/or the like that contains at least one selected from $PO_4$, $BO_2$, $B_4O_7$, $B_3O_5$, and F may be used. For example, monosodium phosphate ($NaH_2PO_4$), disodium phosphate ($Na_2HPO_4$), and/or the like may be used.

The pH adjuster serves to lower the solubility of metal ions inside a reactor to precipitate the metal ions as hydroxides. The pH adjuster is, for example, sodium hydroxide (NaOH), sodium carbonate ($Na_2CO_3$), and/or the like. The pH adjuster is, for example, NaOH.

The complexing agent controls the forming reaction rate of a precipitate in a co-precipitation reaction. The complexing agent may be ammonium hydroxide ($NH_4OH$)(ammonia water), citric acid, acrylic acid, tartaric acid, glycolic acid, and/or the like. The amount of the complexing agent is used at a general (e.g., at any suitable) level. The complexing agent is, for example, ammonia water.

A nickel-based active material according to one or more embodiments is obtained from the above-described nickel-based active material precursor. The nickel-based active material is, for example, a compound represented by Formula 3 or 4:

  Formula 3

  Formula 4 wherein, in Formulae 3 and 4, M is an element selected from B, Mg, Ca, Sr, Ba, Ti, V, Cr, Fe, Cu, Zr, and Al, $0.95 \leq a \leq 1.3$, $x \leq (1-x-y-z)$, $0<x<1$, $0<y<1$, $0<z\leq 0.01$, and $0<\alpha \leq 0.01$, and X is at least one selected from $PO_4$, $BO_2$, $B_4O_7$, $B_3O_5$, and F. As such, in the nickel-based active material of Formula 3 or 4, the content of Ni is greater than that of Co and greater than the content of Mn or Al.

In Formulae 3 and 4, $0.95 \leq a \leq 1.3$, for example, $1.0 \leq a \leq 1.1$. For example, in Formulae 3 and 4, $0.1 \leq x \leq 1/3$, $0<y \leq 0.5$, $0<z \leq 0.01$, $1/3 \leq (1-x-y-z) \leq 0.97$, and $0<\alpha \leq 0.01$. For example, in Formulae 3 and 4, $0.1 \leq x \leq 1/3$, $0.05 \leq y \leq 0.3$, $0<z \leq 0.01$, $1/3 \leq (1-x-y-z) \leq 0.97$, and $0<\alpha \leq 0.01$. For example, in Formulae 3 and 4, $0.1 \leq x \leq 1/3$, $0.05 \leq y \leq 0.3$, $0<z \leq 0.009$, $1/3 \leq (1-x-y-z) \leq 0.95$, and $0<\alpha \leq 0.0013$. For example, in Formulae 3 and 4, $0.1<x \leq 1/3$, $0.05 \leq y \leq 0.3$, $0<z \leq 0.009$, $0.33(1-x-y-z) \leq 0.95$, and $0<\alpha \leq 0.0013$.

The content of Ni in the nickel-based active material may be in a range of, for example, about 33 mol % to about 97 mol %, for example, about 33 mol % to about 95 mol %, for example, about 50 mol % to about 90 mol %, for example, about 60 mol % to about 85 mol %, with respect to a total amount of transition metals. The total amount of transition metals refers to a total amount of nickel, cobalt, and manganese in Formula 3 and a total amount of nickel, cobalt, and aluminium in Formula 4.

The nickel-based active material is, for example, $Li(Ni_{0.6}Co_{0.2}Mn_{0.2})_{1-a}M_aO_{2-\alpha}X_\alpha$, $Li(Ni_{0.5}Co_{0.2}Mn_{0.3})_{1-a}M_aO_{2-\alpha}X_\alpha$, $Li(Ni_{0.7}Co_{0.15}Mn_{0.15})_{1-a}M_aO_{2-\alpha}X_\alpha$, $Li(Ni_{0.85}Co_{0.1}Al_{0.05})_{1-a}M_aO_{2-\alpha}X_\alpha$, or $Li(Ni_{0.91}Co_{0.06}Mn_{0.03})_{1-a}M_aO_{2-\alpha}X_\alpha$, wherein $0<a<0.01$ and $0<\alpha \leq 0.01$, M is at least one element selected from B, Mg, Ca, Sr, Ba, Ti, V, W, Cr, Fe, Cu, Zr, and Al, and X is at least one selected from $PO_4$, $BO_2$, $B_4O_7$, $B_3O_5$, and F. For example, $0<a<0.009$ and $0<\alpha \leq 0.0013$.

The nickel-based active material may have a particle structure and characteristic substantially the same as or similar to those of the above-described nickel-based active material precursor, except that lithium is arranged in the crystal structure and the hydroxide is changed to an oxide.

The nickel-based active material includes, for example, a particulate structure including a core portion, an intermediate layer portion on the core portion, and a shell portion on the intermediate layer portion, in which the intermediate layer portion and the shell portion include primary particles radially arranged on the core portion, and the core portion, the intermediate layer portion, and the shell portion include different cations and/or anions, wherein the cation is at least one selected from B, Mg, Ca, Sr, Ba, Ti, V, Cr, Fe, Cu, Zr, and Al, and the anion is at least one selected from phosphate ($PO_4$), $BO_2$, $B_4O_7$, $B_3O_5$, and F.

The nickel-based active material includes, for example, secondary particles including a plurality of particulate structures, in which each particulate structure includes a core portion, an intermediate layer portion on the core portion, and a shell portion on the intermediate layer portion, the porosity of the core portion, the intermediate layer portion, and the shell portion is sequentially reduced, the intermediate layer portion and the shell portion include primary particles radially arranged on the core portion, and each of the core portion and the intermediate layer portion includes a cation or anion different from that of the shell portion, wherein the cation includes at least one selected from B, Mg, Ca, Sr, Ba, Ti, V, Cr, Fe, Cu, Zr, and Al, and the anion includes at least one selected from phosphate ($PO_4$), $BO_2$, $B_4O_7$, $B_3O_5$, and F.

In the nickel-based active material, each of the core portion and the intermediate layer portion includes a cation or anion different from that of the shell portion. The cations are, for example, metal cations having a larger ionic radius than that of Ni cations. By including metal cations having a larger ionic radius, cation mixing is suppressed or reduced in the crystal lattice, and as a result, the elution of nickel ions is suppressed or reduced, and thus the structural stability of a portion including the cations is enhanced. Anions are, for example, anions having a higher electronegativity than oxygen. By including anions having such a great electronegativity, binding strength between a transition metal layer and an anion layer in the crystal lattice is enhanced, thereby enhancing the structural stability of a portion including the anions. For example, the instability of an anion layer due to lithium entry during charging and discharging is reduced, and gas generation due to oxygen release is suppressed or reduced. Therefore, the nickel-based active material provides both a high discharge capacity and excellent structural stability.

The amount of cations included in the nickel-based active material is, for example, 0.9 mol % or less, 0.7 mol % or less, 0.5 mol % or less, 0.3 mol % or less, or 0.28 mol % or less with respect to a total amount of the nickel-based active material. For example, the amount of the cations included in the nickel-based active material is in a range of about 0.0001 mol % to about 0.9 mol %, about 0.001 mol % to about 0.7 mol %, about 0.001 mol % to about 0.5 mol %, about 0.001 mol % to about 0.3 mol %, or about 0.001 mol % to about 0.28 mol % with respect to the total amount of the nickel-based active material. When the amount of the cations is too large, doping in the shell portion is difficult such that the amount of impurities increases, and the porosity of the shell portion is further increased. Therefore, a lithium battery including such nickel-based active material (e.g., a nickel-based active material in which the amount of cations is outside of the recited range) exhibits reduced volume capacity and deteriorated cycle characteristics.

The amount of the anions included in the nickel-based active material is, for example, 0.06 mol % or less, 0.05 mol % or less, 0.04 mol % or less, or 0.03 mol % or less, with respect to the total amount of the nickel-based active material. The amount of the anions included in the nickel-based active material is in a range of, for example, about 0.0001 mol % to about 0.06 mol %, about 0.001 mol % to about 0.05 mol %, about 0.005 mol % to about 0.04 mol %, or about 0.01 mol % to about 0.03 mol %, with respect to the total amount of the nickel-based active material.

The amount of the cation(s) included in the shell portion of the nickel-based active material is in a range of greater than about 0 mol % to about 2 mol %. For example, 2.0 mol % or less, 1.8 mol % or less, 1.6 mol % or less, 1.4 mol % or less, 1.33 mol % or less, or 0.41 mol % or less, with respect to the total amount of the shell portion. For example, the amount of the cation(s) included in the shell portion of the nickel-based active material is in a range of about 0.0001 mol % to about 2.0 mol %, about 0.001 mol % to about 1.8 mol %, about 0.001 mol % to about 1.6 mol %, about 0.001 mol % to about 1.4 mol %, about 0.001 mol % to about 1.33 mol %, or about 0.001 mol % to about 0.41 mol % with respect to the total amount of the shell portion.

A total amount of the anions included in the core portion and the intermediate layer portion of the nickel-based active material is, for example, 1.0 mol % or less, 0.8 mol % or less, 0.6 mol % or less, 0.4 mol % or less, or 0.18 mol % or less with respect to a total amount of the core portion and the intermediate layer portion. The total amount of the anions included in the core portion and the intermediate layer portion of the nickel-based active material is in a range of about 0.0001 mol % to about 1.0 mol %, about 0.001 mol % to about 0.8 mol %, about 0.001 mol % to about 0.6 mol %, about 0.001 mol % to about 0.4 mol %, or about 0.001 mol % to 0.18 mol %, with respect to the total amount of the core portion and the intermediate layer portion.

When the whole nickel-based active material, the core portion of the nickel-based active material, the intermediate layer portion of the nickel-based active material, and/or the shell portion of the nickel-based active material include cations and/or anions within the above-described amount ranges, the structural stability of the nickel-based active material is further enhanced.

A method of preparing a nickel-based active material from the nickel-based active material precursor is not particularly limited, and may be, for example, a dry process.

The nickel-based active material may be prepared by, for example, mixing a lithium precursor and a nickel-based active material precursor in a certain (set) molar ratio and primarily heat-treating the resulting mixture at a temperature of about 600° C. to about 800° C.

The lithium precursor is, for example, lithium hydroxide, lithium fluoride, lithium carbonate, or a mixture thereof. A mixing ratio of the lithium precursor to the nickel-based active material precursor is adjusted stoichiometrically, for example, to prepare the nickel-based active material of Formula 3 or Formula 4.

The mixing process may be dry mixing, and may be performed using a mixer and/or the like. The dry mixing process may be performed using a mill. Milling conditions are not particularly limited, but milling may be carried out such that that the precursor used as a starting material undergoes little deformation such as pulverization and/or the like. The size of the lithium precursor mixed with the nickel-based active material precursor may be pre-controlled (pre-set). The size (mean particle diameter) of the lithium precursor is in a range of about 5 μm to about 15 μm, for example, about 10 μm. By performing milling on the lithium precursor (having such size) and the nickel-based active material precursor at about 300 rpm to about 3,000 rpm, a desired mixture may be obtained. In the milling process, when an internal temperature of a mixer is increased by 30° C. or more, a cooling process may be performed such that the internal temperature of the mixture is maintained at room temperature (25° C.).

The primarily heat treatment is performed in an oxidative gas atmosphere. The oxidative gas atmosphere uses an oxidative gas such as oxygen or air, and the oxidative gas includes (e.g., consists of), for example, about 10 vol % to about 20 vol % of oxygen or air and about 80 vol % to about 90 vol % of inert gas. The primarily heat treatment may be performed at a densification is capable of providing. The primarily heat treatment is performed at a temperature of, for example, about 600° C. to about 800° C., for example, about 650° C. to about 800° C. The primarily heat treatment time varies depending on the heat treatment temperature, but is, for example, in a range of about 3 hours to about 10 hours.

The method of preparing a nickel-based active material may further include, after the primarily heat treatment, a second heat treatment process performed in an oxidative gas atmosphere while the vent is blocked. The second heat treatment is performed at a temperature of, for example, about 700° C. to about 900° C. The second heat treatment time varies depending on the second heat treatment temperature, but is in a range of, for example, about 3 hours to about 10 hours.

In the second heat treatment process of secondary particles of the nickel-based active material, a hetero-element compound containing at least one selected from Zr, Ti, Al, Mg, W, P, and B may be further added. The hetero-element compound is a compound containing at least one selected from Zr, Ti, Al, Mg, W, P, and B. Non-limiting examples of the hetero-element compound include titanium oxide, zirconium oxide, and aluminium oxide. The hetero-element compound may include both lithium (Li) and a hetero-element. The hetero-element compound is, for example, i) an oxide of at least one selected from Zr, Ti, Al, Mg, W, P, and B; or ii) an oxide containing lithium and at least one selected from Zr, Ti, Al, Mg, W, P, and B. The hetero-element compound is, for example, $ZrO_2$, $Al_2O_3$, $LiAlO_2$, $Li_2TiO_3$, $Li_2ZrO_3$, $LiBO_3$, $Li_3PO_4$, and/or the like. The amount of the hetero-element compound is in a range of about 0.0005 parts by weight to about 0.01 parts by weight with respect to 100 parts by weight of the nickel-based active material. The presence and distribution of the oxide containing the hetero-element may be confirmed through electron probe micro-analysis (EPMA).

A lithium secondary battery according to one or more embodiments includes a positive electrode including the above-described nickel-based active material for a lithium secondary battery, a negative electrode, and an electrolyte arranged therebetween.

A method of manufacturing a lithium secondary battery is not particularly limited, and any suitable method may be used. The lithium secondary battery may be manufactured by, for example, the following method.

A positive electrode and a negative electrode are respectively fabricated by applying a composition for forming a positive active material layer and a composition for forming a negative active material layer on respective current collectors and drying the resulting structures.

The composition for forming a positive active material layer is prepared by mixing a positive active material, a conductive agent, a binder, and a solvent, and for the positive active material, a positive active material according to one or more embodiments is used.

The binder is a component that aids in binding between an active material and a conductive agent and binding between an active material and a current collector, and is added in an amount of about 1 part by weight to about 50 parts by weight with respect to 100 parts by weight of a total amount of the positive active material. Non-limiting examples of the binder may include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene-butadiene rubber, fluorine rubber, and various copolymers.

The conductive agent is not particularly limited as long as it does not cause any chemical change in the fabricated battery and has conductivity, and non-limiting examples thereof include graphite (such as natural graphite and/or artificial graphite); carbonaceous materials (such as carbon black, acetylene black, ketjen black, channel black, furnace black, lamp black, and/or thermal black); conductive fibers (such as carbon fibers and/or metallic fibers); metal powder (such as carbon fluoride powder, aluminium powder, and/or nickel powder); conductive whiskers (such as zinc oxide and/or potassium titanate); conductive metal oxides (such as titanium oxide); and conductive materials (such as polyphenylene derivatives).

As a non-limiting example of the solvent, N-methylpyrrolidone and/or the like may be used.

The amounts of the binder, the conductive agent, and the solvent are at general levels (e.g., at any suitable level).

A positive electrode current collector has a thickness of about 3 µm to about 500 µm, and is not particularly limited as long as it has high conductivity without causing chemical changes in the fabricated battery. Examples of the positive electrode current collector include stainless steel, aluminium, nickel, titanium, sintered carbon, and aluminium or stainless steel that is surface-treated with carbon, nickel, titanium and/or silver, without limitation. The current collector may be processed to have fine irregularities on the surfaces thereof so as to enhance adhesive strength of the current collector to the positive active material, and may be used in any of various suitable forms including films, sheets, foils, nets, porous structures, foams, and/or non-woven fabrics.

Separately, the composition for forming a negative active layer is prepared by mixing a negative active material, a binder, a conductive agent, and a solvent. As the negative active material, a material capable of intercalating and deintercalating lithium ions is used. As a non-limiting example of the negative active material, a carbonaceous material such as graphite, Li metal or an alloy thereof, and/or a silicon oxide-based material may be used.

The binder is added in an amount of about 1 part by weight to about 50 parts by weight with respect to 100 parts by weight of a total weight of the negative active material. In a non-limiting example, the binder may be the same binder as that of the positive electrode.

The conductive agent is used in an amount of about 1 part by weight to about 5 parts by weight with respect to 100 parts by weight of the total weight of the negative active material. When the amount of the conductive agent is within the above-described range, the finally obtained electrode has excellent (or suitable) conductivity.

The amount of the solvent is in a range of about 1 part by weight to about 10 parts by weight with respect to 100 parts by weight of the total weight of the negative active material. When the amount of the solvent is within the above range, an operation for forming a negative active material layer is facilitated.

As the conductive agent and the solvent for the negative electrode, the same conductive agent and solvent as those used in fabricating the positive electrode may be used.

A negative electrode current collector may be fabricated to a thickness of about 3 µm to about 500 µm. The negative electrode current collector is not particularly limited as long as it has conductivity without causing chemical changes in the fabricated battery, and examples of the negative electrode current collector include copper, stainless steel, aluminium, nickel, titanium, sintered carbon, copper and/or stainless steel that is surface-treated with carbon, nickel, titanium and/or silver, and aluminium-cadmium alloys, without limitation. In addition, as in the positive electrode current collector, the negative electrode current collector may be processed to have fine irregularities on the surfaces thereof so as to enhance adhesive strength of the current collector to the negative active material, and may be used in any of various suitable forms including films, sheets, foils, nets, porous structures, foams, and/or non-woven fabrics.

A separator is disposed between the positive and negative electrodes fabricated by the above-described processes.

The separator has a pore diameter of about 0.01 µm to about 10 µm and a thickness of about 5 µm to about 300 µm. For example, the separator may be an olefin-based polymer (such as polypropylene, polyethylene, and/or the like); a sheet or non-woven fabric made of glass fiber; and/or the like. When a solid electrolyte (such as a polymer and/or the like) is used as an electrolyte, the solid electrolyte may also act as a separator.

A lithium salt-containing non-aqueous electrolyte includes (e.g., consists of) a non-aqueous electrolyte and a lithium salt. As the non-aqueous electrolyte, a non-aqueous electrolytic solution, an organic solid electrolyte, and/or an inorganic solid electrolyte may be used.

As the non-aqueous electrolytic solution, any of aprotic organic solvents, for example, N-methyl-2-pyrrolidone, propylene carbonate, ethylene carbonate, butylene carbonate, dimethyl carbonate, diethyl carbonate, γ-butyrolactone, 1,2-dimethoxy ethane, 2-methyl tetrahydrofuran, dimethylsulfoxide, 1,3-dioxolane, N,N-formamide, N,N-dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate may be used, but the present disclosure is not limited thereto.

Non-limiting examples of the organic solid electrolyte include polyethylene derivatives, polyethylene oxide derivatives, polypropylene oxide derivatives, phosphoric acid ester polymers, polyester sulfide, polyvinyl alcohols, and polyvinylidene fluoride. Non-limiting examples of the inorganic solid electrolyte include $Li_3N$, LiI, $Li_5NI_2$, $Li_3N$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte, and non-limiting examples of the lithium salt include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, $(FSO_2)_2NLi$, lithium chloroborate, lower aliphatic carboxylic acid lithium, lithium tetraphenyl borate, and lithium imide.

Figure 4:
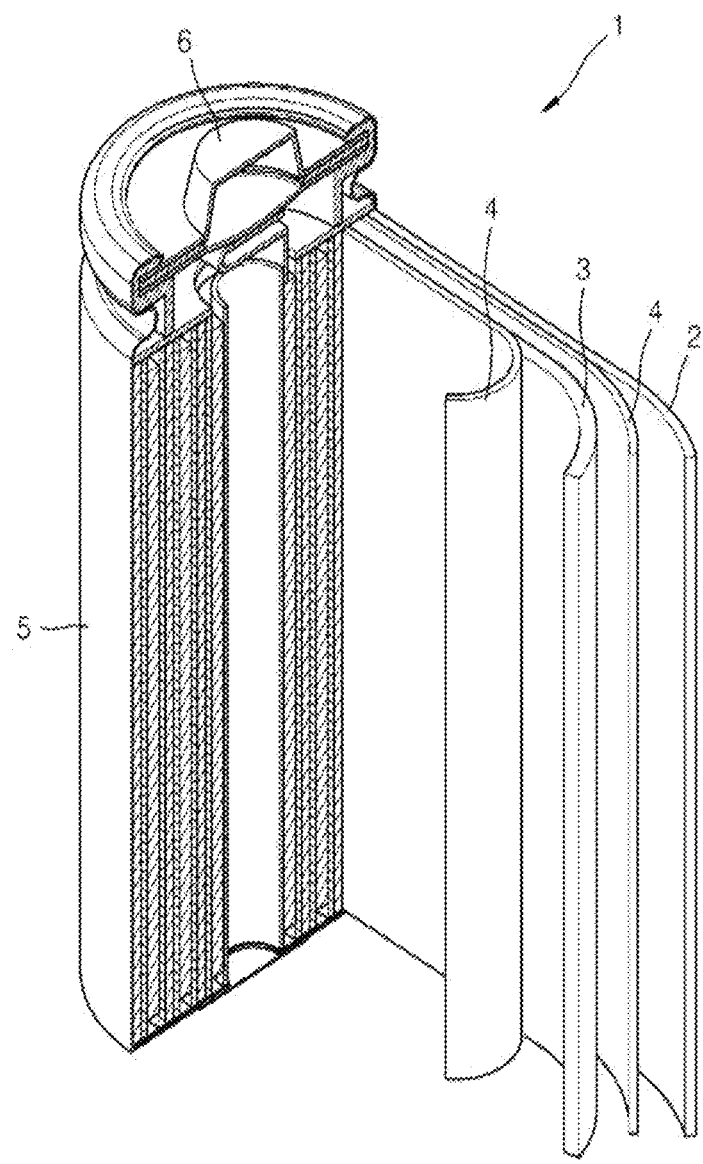
FIG. 4 is a schematic view illustrating a structure of a lithium secondary battery according to an embodiment.

FIG. 4 is a schematic cross-sectional view illustrating a structure of a lithium secondary battery 1 according to an embodiment. Referring to FIG. 4, the lithium secondary battery 1 includes a positive electrode 3, a negative electrode 2, and a separator 4. The positive electrode 3, the negative electrode 2, and the separator 4 are wound or folded, and then accommodated in a battery case 5. Subsequently, an organic electrolytic solution is injected into the battery case 5 and the battery case 5 is sealed by a cap assembly 6, thereby completing the manufacture of the lithium secondary battery 1. The battery case 5 may have a cylindrical shape, a rectangular shape or a thin-film shape. For example, the lithium secondary battery 1 may be a large-sized thin film battery. The lithium secondary battery 1 may be a lithium ion battery.

A separator may be disposed between a positive electrode and a negative electrode to thereby form a battery assembly. The battery assembly may be stacked in a bi-cell structure, and impregnated with an organic electrolytic solution, and the resulting structure may be accommodated in a pouch and hermetically sealed, thereby completing the manufacture of a lithium ion polymer battery. In one or more embodiments, a plurality of battery assemblies are stacked to form a battery pack, and the battery pack may be used in any device requiring high capacity and/or high-power output. For example, the battery pack may be used in notebook computers, smartphones, electric vehicles, and/or the like. In addition, the lithium secondary battery may be used in electric vehicles (EVs) due to excellent storage stability at high temperatures, excellent lifespan characteristics, and excellent rate capability thereof. For example, the lithium secondary battery may be used in hybrid vehicles such as plug-in hybrid electric vehicles (PHEVs).

Hereinafter, the present disclosure will be described in further detail with reference to the following examples and comparative examples. However, these examples are provided for illustrative purposes only and are not intended to limit the scope of the present disclosure.

Preparation Example 1

Preparation of Nickel-Based Active Material Precursor (Core/Intermediate/Shell=P/P/W)

A nickel-based active material precursor was synthesized through co-precipitation. In the following preparation process, nickel sulfate ($NiSO_4 \cdot 6H_2O$), cobalt sulfate ($CoSO_4 \cdot 7H_2O$), and manganese sulfate ($MnSO_4 \cdot H_2O$), as metal raw materials for forming a nickel-based active material precursor, were dissolved in distilled water as a solvent in a molar ratio of Ni:Co:Mn of 70:15:15 to prepare a mixed solution. In addition, ammonia water ($NH_4OH$) (as a complexing agent for forming a complex compound), an aqueous disodium phosphate ($Na_2HPO_4$) solution (as a phosphate-containing compound), tungsten oxide ($WO_2$) dissolved in an aqueous sodium hydroxide solution (as a tungsten-containing compound), and sodium hydroxide (NaOH) (as a precipitating agent and a pH adjuster) were prepared.

First Process: 3.0 $kW/m^3$, $NH_3 \cdot H_2O$ 0.50 M, pH of 11.0 to 11.5, reaction time of 6 hours Ammonia water was added at a concentration of 0.50 M into a reactor equipped with a stirrer. While a stirring power of 3.0 $kW/m^3$ and a reaction temperature of 50° C. were maintained, 2 mol/L (M) of metal raw materials (a mixed solution of nickel sulfate, cobalt sulfate, and manganese sulfate), 0.50 M of ammonia water, and an aqueous disodium phosphate solution were added at flow rates of 4.3 ml/min, 0.7 ml/min, and 1.6 ml/min, respectively, to allow a reaction to occur therebetween. Subsequently, NaOH was added thereto to maintain the pH of the reaction mixture. The pH of the reaction mixture in the reactor was maintained at 11.00 to 11.50. The reaction mixture was stirred for 6 hours within such a pH range to allow a first process reaction to occur. As a result of the reaction, it was confirmed that the obtained core particles had an average size of about 8 μm to about 9 μm. A concentration of the aqueous disodium phosphate solution used in the preparation of the core was determined to give half of required content of phosphate in resulting precursor.

Second Process: 2.5 $kW/m^3$, $NH_3 \cdot H_2O$ 0.55 M, pH: 10.5 to 11, Reaction Time: 13 hours After the first process reaction, the internal stirring power of the reactor was reduced to 2.5 $kW/m^3$ and while the reaction temperature was maintained at 50° C., 2 mol/L (M) of metal raw materials, 0.55 M of ammonia water, and an aqueous disodium phosphate solution were added into the reactor at flow rates of 5.38 ml/min, 0.9 ml/min, and 2.0 ml/min, respectively. At this time, the concentration of the complexing agent was maintained at 0.55 M. NaOH was added to the reaction mixture to maintain the pH thereof. The pH of the reaction mixture in the reactor was maintained at 10.50 to 11.00. The reaction mixture was stirred for 13 hours within the above pH range to allow a second process reaction to occur. As a result, it was confirmed that product particles including a core and an intermediate layer, which were obtained through the reaction, had an average size of 11 μm to 12 μm. A concentration of the aqueous disodium phosphate solution used in the preparation of the intermediate layer was determined to give half of required content of phosphate in resulting precursor.

Third Process: 2.0 $kW/m^3$, $NH_3 \cdot H_2O$ 0.60 M, pH: 10.5 to 11, Reaction Time: 12 hours After the second process reaction, half of the volume of the reaction product was removed from the reactor and the amount of the reaction product in the reactor was diluted to 50 vol %. The internal stirring power of the reactor was reduced to 2.0 $kW/m^3$ and while the reaction temperature was maintained at 50° C., 2 mol/L (M) of metal raw materials, 0.60 M of ammonia water, and an aqueous tungsten oxide ($WO_2$) solution were added into the reactor at flow rates of 4.3 ml/min, 0.8 ml/min, and 1.6 ml/min, respectively. At this time, the concentration of the complexing agent was maintained at 0.60 M. NaOH was added to the reaction mixture to maintain the pH thereof. The pH of the reaction mixture in the reactor was maintained at 10.50 to 11.00. The reaction mixture was stirred for 12 hours within the above pH range to allow a third process reaction to occur. As a result, it was confirmed that the mean particle diameter (D50) of the product particles reached a target value, i.e., 13 µm to 14 µm. An amount of the tungsten oxide ($WO_2$) added in the preparation of the shell was determined to give required content of tungsten in the resulting nickel-based active material precursor.

Post-Processing

The reaction product was washed to remove unnecessary ions from the product particles, and then the washed resulting product was dried by hot air at about 150° C. for 24 hours, thereby obtaining a nickel-based active material precursor.

In the nickel-based active material precursor, with respect to a total amount of the nickel-based active material precursor, the content of phosphate was 0.06 mol %, and the content of tungsten was 0.28 mol %. In the shell portion of the nickel-based active material precursor, the content of phosphate was 0 mol %, and the content of tungsten was 0.41 mol %, and with respect to a total amount of core and intermediate layer portions of the nickel-based active material precursor, the content of phosphate was 0.18 mol %, and the content of tungsten was 0 mol %.

Preparation Example 2

Preparation of Nickel-Based Active Material Precursor (Core/Intermediate/Shell=P/P/W)

A nickel-based active material precursor was prepared in the same (or substantially the same) manner as in Preparation Example 1, except that the amount of tungsten added in preparation of a shell was changed to 3.7 mol % with respect to a total amount of the nickel-based active material precursor.

As a result of analyzing the synthesized precursor, the content of phosphate was 0.06 mol %, and the content of tungsten (W) was 0.9 mol %. Thus, it was confirmed that even though an excess amount of tungsten was added, the content of tungsten included in the shell was 0.9 mol % with respect to the total amount of the nickel-based active material precursor. In the shell portion of the nickel-based active material precursor, the content of phosphate was 0 mol %, and the content of tungsten was 1.33 mol %, and with respect to a total amount of core and intermediate layer portions of the nickel-based active material precursor, the content of phosphate was 0.18 mol %, and the content of tungsten was 0 mol %.

Comparative Preparation Example 1

Preparation of Nickel-Based Active Material Precursor (Core/Intermediate/Shell=0/0/0)

A nickel-based active material precursor was synthesized using the same raw materials as those used in Preparation Example 1 through co-precipitation, which will be described below.

First Process: 3.0 kW/m³, $NH_3$ 0.35 M, pH: 11.0 to 11.5, Reaction Time: 6 hours A first process reaction was performed in the same (or substantially the same) manner as in Preparation Example 1, except that the concentration of the complexing agent (ammonia water) was changed to 0.35 M instead of 0.50 M, and the phosphate-containing compound was not added.

Second Process: 2.5 kW/m³, $NH_3$ 0.40 M, pH: 10.5 to 11.0, Reaction Time: 21 hours A second process reaction was performed in the same (or substantially the same) manner as in Preparation Example 1, except that the concentration of the complexing agent (ammonia water) was changed to 0.40 M instead of 0.55 M, the phosphate-containing compound was not added, and the reaction time was changed to 21 hours instead of 13 hours.

Third Process: 2.0 kW/m³, $NH_3$ 0.40 M, pH: 10.5 to 11.0, Reaction Time: 23 hours After the second process reaction, half of the volume of the reaction product was removed from the reactor and the amount of the reaction product in the reactor was diluted to 50 vol %. The internal stirring power of the reactor was reduced to 2.0 kW/m³ and while the reaction temperature was maintained at 50° C., metal raw materials and ammonia water were added into the reactor at flow rates of 7.2 ml/min and 0.8 ml/min, respectively. At this time, the concentration of the complexing agent (ammonia water) was maintained at 0.40 M. NaOH was added to the reaction mixture to maintain the pH thereof. The pH of the reaction mixture in the reactor was maintained at 10.50 to 11.00. The reaction mixture was stirred for 23 hours within the above pH range to allow a third process reaction to occur. As a result, it was confirmed that the D50 of the product particles reached a target value, i.e., 13 µm to 14 µm.

Post-Processing

Post-processing was carried out in the same (or substantially the same) manner as in Preparation Example 1.

As a result of analyzing the synthesized precursor, the content of phosphate was 0 mol %, and the content of tungsten (W) was 0 mol %.

Comparative Preparation Example 2

Preparation of Nickel-Based Active Material Precursor (Core/Intermediate/Shell=W/W/W)

A nickel-based active material precursor was synthesized using the same raw materials as those used in Preparation Example 1 through co-precipitation, which will be described below.

First Process: 3.0 kW/m³, $NH_3$ 0.35 M, pH: 11.0 to 11.5, Reaction Time: 6 hours A first process reaction was performed in the same (or substantially the same) manner as in Preparation Example 1, except that the concentration of the complexing agent (ammonia water) was changed to 0.35 M instead of 0.50 M, and an aqueous tungsten oxide solution was added at a flow rate of 0.5 ml/min instead of the phosphate-containing compound. An amount of the tungsten oxide ($WO_2$) added in the preparation of the core was determined to give required content of tungsten in the resulting nickel-based active material precursor.

Second Process: 2.5 kW/m³, $NH_3$ 0.40 M, pH: 10.5 to 11.0, Reaction Time: 21 hours A second process reaction was performed in the same (or substantially the same) manner as in Preparation Example 1, except that the concentration of the complexing agent (ammonia water) was changed to 0.40 M instead of 0.55 M, an aqueous tungsten oxide solution was added at a flow rate of 0.7 ml/min instead of the phosphate-containing compound, and the reaction time was changed to 21 hours instead of 13 hours. An amount of the tungsten oxide ($WO_2$) added in the preparation of the intermediate layer was determined to give required content of tungsten in resulting nickel-based active material precursor.

Third Process: 2.0 kW/m$^3$, NH$_3$ 0.40 M, pH: 10.5 to 11.0, Reaction Time: 23 hours After the second process reaction, half of the volume of the reaction product was removed from the reactor and the amount of the reaction product in the reactor was diluted to 50 vol %. The internal stirring power of the reactor was reduced to 2.0 kW/m$^3$ and while the reaction temperature was maintained at 50° C., metal raw materials, ammonia water, and an aqueous tungsten oxide solution were added into the reactor at flow rates of 7.2 ml/min, 0.8 ml/min, and 0.9 ml/min, respectively. At this time, the concentration of the complexing agent (ammonia water) was maintained at 0.40 M. NaOH was added to the reaction mixture to maintain the pH thereof. The pH of the reaction mixture in the reactor was maintained at 10.50 to 11.00. The reaction mixture was stirred for 23 hours within the above pH range to allow a third process reaction to occur. As a result, it was confirmed that the D50 of the product particles reached a target value, i.e., 13 μm to 14 μm. An amount of the tungsten oxide (WO$_2$) added in the preparation of the shell was determined to give required content of tungsten in resulting nickel-based active material precursor.

Post-Processing

Post-processing was carried out in the same (or substantially the same) manner as in Preparation Example 1.

As a result of analyzing the synthesized precursor, the content of phosphate was 0 mol %, and the content of tungsten (W) was 0.1 mol %.

Comparative Preparation Example 3

Preparation of Nickel-Based Active Material Precursor (Core/Intermediate/Shell=P/P/P)

A nickel-based active material precursor was synthesized using the same raw materials as those used in Preparation Example 1 through co-precipitation, which will be described below.

First Process: 3.0 kW/m$^3$, NH$_3$ 0.35 M, pH: 11.0 to 11.5, Reaction Time: 6 hours A first process reaction was performed in the same (or substantially the same) manner as in Preparation Example 1, except that the concentration of the complexing agent (ammonia water) was changed to 0.35 M instead of 0.50 M, and an aqueous disodium phosphate solution was added at a flow rate of 0.7 ml/min instead of a flow rate of 1.6 ml/min. A concentration of the aqueous disodium phosphate solution used in the preparation of the core was determined to give required content of phosphate in resulting precursor.

Second Process: 2.5 kW/m$^3$, NH$_3$ 0.40 M, pH: 10.5 to 11.0, Reaction Time: 21 hours A second process reaction was performed in the same (or substantially the same) manner as in Preparation Example 1, except that the concentration of the complexing agent (ammonia water) was changed to 0.40 M instead of 0.55 M, an aqueous disodium phosphate solution was added at a flow rate of 0.9 ml/min instead of 2.0 ml/min, and the reaction time was changed to 21 hours instead of 13 hours. A concentration of the aqueous disodium phosphate solution used in the preparation of the intermediate layer was determined to give required content of phosphate in resulting precursor.

Third Process: 2.0 kW/m$^3$, NH$_3$ 0.40 M, pH: 10.5 to 11.0, Reaction Time: 23 hours After the second process reaction, half of the volume of the reaction product was removed from the reactor and the amount of the reaction product in the reactor was diluted to 50 vol %. The internal stirring power of the reactor was reduced to 2.0 kW/m$^3$ and while the reaction temperature was maintained at 50° C., metal raw materials, ammonia water, and an aqueous disodium phosphate solution were added into the reactor at flow rates of 7.2 ml/min, 0.8 ml/min, and 1.2 ml/min, respectively. At this time, the concentration of the complexing agent (ammonia water) was maintained at 0.40 M. NaOH was added to the reaction mixture to maintain the pH thereof. The pH of the reaction mixture in the reactor was maintained at 10.50 to 11.00. The reaction mixture was stirred for 23 hours within the above pH range to allow a third process reaction to occur. As a result, it was confirmed that the D50 of the product particles reached a target value, i.e., 13 μm to 14 μm. A concentration of the aqueous disodium phosphate solution used in the preparation of the shell was determined to give required content of phosphate in resulting precursor.

Post-Processing

Post-processing was carried out in the same (or substantially the same) manner as in Preparation Example 1.

As a result of analyzing the synthesized precursor, the content of phosphate was 0.13 mol %, and the content of tungsten (W) was 0 mol %.

Example 1

Preparation of Nickel-Based Active Material

A composite metal hydroxide, which is the nickel-based active material precursor prepared according to Preparation Example 1, and lithium hydroxide (LiOH) were mixed in a molar ratio of 1:1 and subjected to first heat treatment in an oxygen atmosphere at about 780° C. for 6 hours, thereby obtaining nickel-based active material secondary particles (nickel-based active material intermediate). The obtained secondary particles were pulverized and then subjected to second heat treatment in an oxygen atmosphere at about 740° C. for 6 hours, thereby obtaining nickel-based active material secondary particles each having a triple structure including a core, intermediate layer and a shell.

With respect to a total amount of the nickel-based active material, the content of phosphate was 0.06 mol %, and the content of tungsten was 0.28 mol %.

In a shell portion of the nickel-based active material, the content of phosphate was 0 mol %, and the content of tungsten was 0.41 mol %, and with respect to a total amount of core and intermediate layer portions of the nickel-based active material, the content of phosphate was 0.18 mol %, and the content of tungsten was 0 mol %.

Example 2

Preparation of Nickel-Based Active Material

A nickel-based active material was prepared in the same (or substantially the same) manner as in Example 1, except that the nickel-based active material precursor prepared according to Preparation Example 2 was used instead of the nickel-based active material precursor of Preparation Example 1.

In the nickel-based active material, the content of phosphate was 0.06 mol %, and the content of tungsten was 0.9 mol %.

In a shell portion of the nickel-based active material, the content of phosphate was 0 mol %, and the content of tungsten was 1.33 mol %, and with respect to a total amount of core and intermediate layer portions of the nickel-based active material, the content of phosphate was 0.18 mol %, and the content of tungsten was 0 mol %.

Comparative Example 1

Preparation of Nickel-Based Active Material

Nickel-based active material secondary particles were obtained in the same (or substantially the same) manner as in Example 1, except that the nickel-based active material precursor prepared according to Comparative Preparation Example 1 was used instead of the nickel-based active material precursor of Preparation Example 1.

As a result of analyzing the nickel-based active material, the content of phosphate was 0 mol %, and the content of tungsten (W) was 0 mol %.

Comparative Example 2

Preparation of Nickel-Based Active Material

Nickel-based active material secondary particles were obtained in the same (or substantially the same) manner as in Example 1, except that the nickel-based active material precursor prepared according to Comparative Preparation Example 2 was used instead of the nickel-based active material precursor of Preparation Example 1.

As a result of analyzing the nickel-based active material, the content of phosphate was 0 mol %, and the content of tungsten (W) was 0.1 mol %.

Comparative Example 3

Preparation of Nickel-Based Active Material

Nickel-based active material secondary particles were obtained in the same (or substantially the same) manner as in Example 1, except that the nickel-based active material precursor prepared according to Comparative Preparation Example 3 was used instead of the nickel-based active material precursor of Preparation Example 1.

As a result of analyzing the nickel-based active material, the content of phosphate was 0.13 mol %, and the content of tungsten (W) was 0 mol %.

Manufacture Example 1: Coin Half-Cell

A coin half-cell was manufactured using the nickel-based active material secondary particles prepared according to Example 1 as a positive active material by the following method.

A mixture of 96 g of the nickel-based active material secondary particles of Example 1, 2 g of polyvinylidene fluoride, 47 g of N-methylpyrrolidone as a solvent, and 2 g of carbon black as a conductive agent was uniformly dispersed using a mixer to remove air bubble from the mixture, thereby preparing a slurry for forming a positive active material layer.

The slurry prepared according to the above-described process was coated onto aluminium foil using a doctor blade to fabricate a thin electrode plate, and then dried at 135° C. for 3 hours or more, followed by roll-pressing and vacuum drying, thereby completing the fabrication of a positive electrode.

The positive electrode and Li metal as a counter electrode were used to manufacture a 2032-type coin half-cell. A separator (thickness: about 16 μm) formed of a porous polyethylene (PE) film was disposed between the positive electrode and the Li metal counter electrode, and an electrolytic solution was injected therebetween, thereby completing the manufacture of a 2032-type coin half-cell. As the electrolytic solution, a solution prepared by dissolving 1.1 M LiPF$_6$ in a mixed solvent of ethylene carbonate (EC) and ethyl methyl carbonate (EMC) in a volume ratio of 3:5 was used.

Comparative Manufacture Example 1

Manufacture of Coin Half-Cell

A lithium secondary battery was manufactured in the same (or substantially the same) manner as in Manufacture Example 1, except that the nickel-based active material prepared according to Comparative Example 1 was used instead of the nickel-based active material of Example 1.

Comparative Manufacture Example 2

Manufacture of Coin Half-Cell

A lithium secondary battery was manufactured in the same (or substantially the same) manner as in Manufacture Example 1, except that the nickel-based active material prepared according to Comparative Example 2 was used instead of the nickel-based active material of Example 1.

Comparative Manufacture Example 3

Manufacture of Coin Half-Cell

A lithium secondary battery was manufactured in the same (or substantially the same) manner as in Manufacture Example 1, except that the nickel-based active material prepared according to Comparative Example 3 was used instead of the nickel-based active material of Example 1.

Evaluation Example 1

Particle Size Analysis (Active Materials Precursor)

Particle size analysis was performed on the nickel-based active material precursors prepared according to Preparation Example 1 and Comparative Preparation Examples 1 to 3. The particle size analysis results thereof are shown in Table 1 below. In Table 1, D10, D50, and D90 denote particle diameters corresponding to 10%, 50%, and 90%, respectively, when the particle diameters of the respective particles are measured and the volumes thereof are cumulated starting from the smallest particles. That is, it can be confirmed that the prepared active material precursors have a similar particle diameter distribution.

TABLE 1

| Classification | D10 | D50 | D90 |
| --- | --- | --- | --- |
| Preparation Example 1 | 10.1 | 13.4 | 17.1 |
| Comparative Preparation Example 1 | 10.4 | 12.9 | 15.7 |
| Comparative Preparation Example 2 | 9.7 | 13.2 | 17.1 |
| Comparative Preparation Example 3 | 9.6 | 12.9 | 16.6 |

Evaluation Example 2

Analysis of Composition (Active Materials Precursor)

The composition of each of the nickel-based active material precursors prepared according to Preparation Examples 1 and 2 and Comparative Preparation Examples 1 to 3 is shown in Table 2 below. The composition was analyzed using ICP.

TABLE 2

| [mol %] | Total amount of core portion and intermediate layer portion (mol %) | | Shell portion (mol %) | | Total amount of nickel-based active material precursor (mol %) | |
| --- | --- | --- | --- | --- | --- | --- |
| | W | $PO_4$ | W | $PO_4$ | W | $PO_4$ |
| Comparative Preparation Example 1 | — | — | — | — | — | — |
| Comparative Preparation Example 2 | 0.1 | — | 0.1 | — | 0.1 | — |
| Comparative Preparation Example 3 | — | 0.13 | — | 0.13 | — | 0.13 |
| Preparation Example 1 | — | 0.18 | 0.41 | — | 0.28 | 0.06 |
| Preparation Example 2 | — | 0.18 | 1.33 | — | 0.90 | 0.06 |

Referring to Table 2, the composition of a cation and an anion doped in the nickel-based active material precursor of Preparation Examples 1 and 2 were confirmed.

It was confirmed that both the cation and the anion were doped in the nickel-based active material precursor of Preparation Examples 1 and 2, there was no doping in the case of Comparative Preparation Example 1, the cation was doped in the case of Comparative Preparation Example 2, and the anion was doped in the case of Comparative Preparation Example 3. The total amount of the core portion and the intermediate layer portion is the amount of cations/anions with respect to a total volume of these regions, the amount of the shell portion is the amount of cations/anions with respect to a volume of the shell portion, and the total amount of the nickel-based active material precursor is the amount of cations/anions with respect to a total volume of the nickel-based active material precursor.

Evaluation Example 3

Residual Lithium Analysis (Active Material)

Residual lithium of each of the nickel-based active material of Example 1 and Comparative Examples 1 to 3 was analyzed using the following method.

10 g of each sample was mixed with 100 ml of distilled water, and the resulting mixture was stirred at 300 rpm for 30 minutes. 50 ml of a liquid filtered from the mixed solution was collected and mixed with 100 ml of pure water, and was then titrated with a hydrochloric acid solution.

The amounts of lithium carbonate and lithium hydroxide were calculated from equivalence point 1 (EP1) and equivalence point 2 (EP2) in accordance with the injection of hydrochloric acid, and total residual lithium was calculated from EP2.

TABLE 3

| | $Li_2CO_3$ [wt %] | LiOH [wt %] | Total residual lithium [ppm] |
| --- | --- | --- | --- |
| Example 1 | 0.120 | 0.605 | 1981 |
| Comparative Example 1 | 0.206 | 0.643 | 2252 |
| Comparative Example 2 | 0.164 | 0.498 | 1753 |
| Comparative Example 3 | 0.259 | 0.871 | 3013 |

From the results of Table 3, it was confirmed that the amount of residual lithium was rapidly increased in Comparative Example 3 where phosphate was included in a shell, compared to the case of Comparative Example 1 not including an additive. In contrast, the amount of residual lithium was reduced in the cases of Example 1 and Comparative Example 2 where tungsten was included in a shell, and the case of Comparative Example 2 exhibiting a high concentration of tungsten had the smallest amount of residual lithium. From these results, it was confirmed that when tungsten was present in a shell layer, the amount of residual lithium was reduced.

When the amount of residual lithium is increased to 3,000 ppm or more, gas generation is rapidly increased during operation of a battery.

Evaluation Example 4

Structural Analysis of Active Material Particles

Scanning electron microscope (SEM) images of cross-sections of the nickel-based active materials prepared according to Examples 1 and 2 were captured, and the results thereof are respectively shown in FIGS. 2A and 2B.

Referring to FIG. 2A, the nickel-based active material of Example 1 includes a porous core illustrated on the left lower side of the drawing, an oriented intermediate layer on the porous core, and an oriented shell on the intermediate layer.

Referring to FIG. 2B, it was confirmed that the nickel-based active material of Example 2 included an oriented intermediate layer illustrated on the left lower side of the drawing and an oriented shell on the oriented intermediate layer, and the porosity of the shell portion was increased, such that the shell portion had reduced density.

As illustrated in FIG. 2A, the intermediate layer and the shell arranged on the porous core of the nickel-based active material of Example 1 had a radially arranged structure and had a lower porosity than that of the core.

As illustrated in FIG. 2B, in the nickel-based active material of Example 2, the shell had a higher porosity than that of the intermediate layer. In one or more embodiments, the porous core also had a higher porosity than that of the intermediate layer. Thus, it was confirmed that, when the content of tungsten was increased, the porosity of the active material was increased.

Figure 2C:
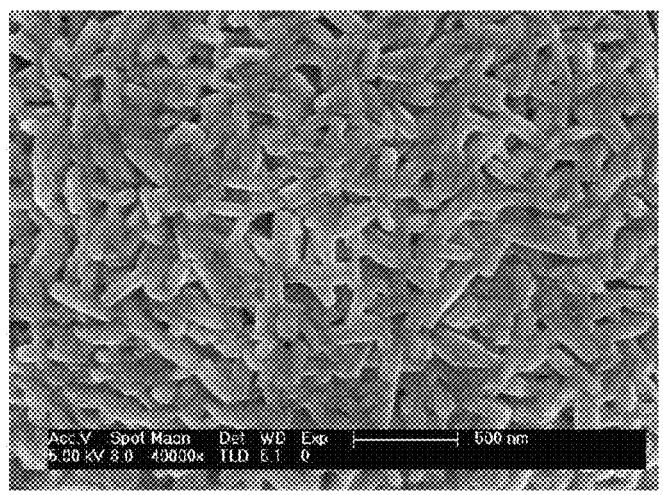
FIG. 2C is an SEM image showing a surface of the nickel-based active material of Example 2.
Figure 2D:
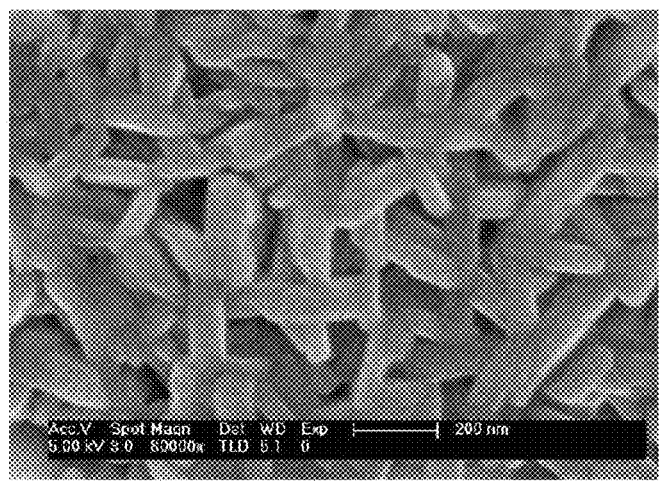
FIG. 2D is an SEM image showing the surface of the nickel-based active material of Example 2, at a resolution two times that of the image of FIG. 2C.

As illustrated in FIGS. 2C and 2D, it was confirmed that a surface of the nickel-based active material of Example 2 included open pores connecting the inside of active material particles to the surface thereof.

Active material precursor particles respectively corresponding to the active material particles of FIGS. 2A and 2B also had a structure similar to that of the active material particles.

Figure 3B:
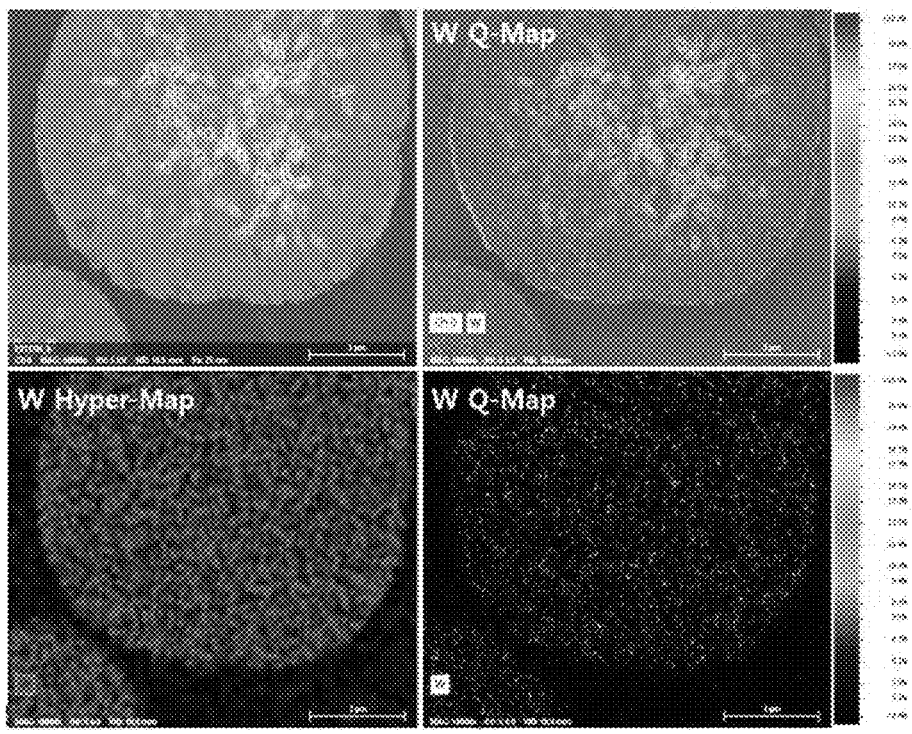

A high-angle annular dark-field scanning transmission electron microscope (HAADF-STEM) image and an energy-dispersive X-ray spectroscopy (EDS) image of cross-sections of the nickel-based active materials of Example 2 and Comparative Example 2 were captured, and the results thereof are illustrated in FIGS. 3A and 3B.

As illustrated in FIG. 3A, it was confirmed that the concentration of tungsten (W) in a shell of the nickel-based active material of Example 2 appeared darker, and as illustrated in FIG. 3B, it was confirmed that the concentration of tungsten (W) appeared uniformly throughout particles of the nickel-based active material of Comparative Example 2.

Thus, it was confirmed that, while tungsten (W) was doped in the shell of the nickel-based active material of Example 2, tungsten (W) was doped throughout particles of the nickel-based active material of Comparative Example 2. From these results, it was confirmed that cations/anions doped in preparation of an active material precursor maintained an initial concentration distribution in a structure of the precursor and a structure of an active material prepared therefrom without being diffused and/or mixed in active material particles.

Evaluation Example 5

Lifespan Characteristics at High-Temperature (45° C.)

High-temperature lifespan characteristics of the coin half-cells manufactured according to Manufacture Example 1 and Comparative Manufacture Examples 1 to 3 were evaluated using the following method.

Each of the coin half-cells of Manufacture Example 1 and Comparative Manufacture Examples 1 and 3 was charged/discharged once at 0.1 C and at room temperature, thereby performing a formation operation, and then one cycle of charging and discharging at 0.2 C was performed on each coin half-cell to confirm initial charge/discharge characteristics thereof, and cycle characteristics of each coin half-cell were evaluated while the cycle of charging/discharging was repeated 50 times at 1 C and 45° C. The charging process was set such that it started with a constant current (CC) and then was changed to a constant voltage (CV), and was cut off at 4.3 V and 0.05 C, and the discharging process was set such that it was cut off at 3.0 V in a CC mode. Changes in discharge capacity in accordance with cycle repetition were examined, high-temperature lifespan was calculated by Equation 1 below, and some of the results thereof are shown in Table 4 below.

Lifespan (%)=(discharge capacity after $50^{th}$ cycle/discharge capacity after $1^{st}$ cycle)×100     Equation 1

TABLE 4

| Classification | High-temperature lifespan (%) |
|---|---|
| Manufacture Example 1 | 98.4 |
| Comparative Manufacture Example 1 | 97.6 |
| Comparative Manufacture Example 3 | 98.0 |

Referring to Table 4, it was confirmed that the coin half-cell of Manufacture Example 1 exhibited enhanced high-temperature lifespan characteristics as compared to those of Comparative Manufacture Examples 1 and 3.

Evaluation Example 6

Charge and Discharge Characteristics (Initial Efficiency and Capacity)

Each of the coin half-cells of Manufacture Example 1 and Comparative Manufacture Examples 1 to 3 was first charged/discharged once at 0.1 C, thereby performing a formation operation. Subsequently, initial charge/discharge characteristics of each coin half-cell were examined by performing one cycle of charging and discharging ($1^{st}$ cycle) at 0.2 C to confirm initial discharge capacity. The charging process was set such that it started with a constant current (CC) and then was changed to a constant voltage (CV), and was cut off at 4.3 V and 0.05 C, and the discharging process was set such that it was cut off at 3.0 V in a CC mode.

Initial charge efficiency (I.C.E) was measured according to Equation 2 below.

Initial charge efficiency [%]=[discharge capacity at $1^{st}$ cycle/charge capacity at $1^{st}$ cycle]×100     Equation 2

Initial charge efficiency and initial discharge capacity of each of the coin half-cells of Manufacture Example 1 and Comparative Manufacture Examples 1 to 3 were measured, and the results thereof are shown in Table 5 below. Initial discharge capacity is discharge capacity when initial charge efficiency is measured.

TABLE 5

| | Initial charge efficiency [%] | Initial discharge capacity [mAh/g] |
|---|---|---|
| Manufacture Example 1 | 96.2 | 195.8 |
| Comparative Manufacture Example 1 | 94.1 | 194.4 |
| Comparative Manufacture Example 2 | 95.6 | 183.7 |
| Comparative Manufacture Example 3 | 95.0 | 194.7 |

Referring to Table 5, it was confirmed that the coin half-cell of Manufacture Example 1 exhibited enhanced initial charge/discharge efficiency and increased discharge capacity, as compared to those of each of the coin half-cells of Comparative Manufacture Examples 1 to 3.

Evaluation Example 7

Rate Capability Evaluation

Each of the coin half-cells of Manufacture Example 1 and Comparative Manufacture Examples 1 to 3 was charged at a constant current of 0.2 C and a constant voltage of 4.3 V, the charging process was cut off at 0.05 C, followed by resting for 10 minutes, and then each coin half-cell was discharged at a constant current of 0.1 C until the voltage reached 3.0 V. This cycle of charging and discharging was repeated 3 times.

At the 4$^{th}$ cycle, each coin half-cell was charged at a constant current of 0.2 C and a constant voltage of 4.3 V, the charging process was cut off at 0.05 C, followed by resting for 10 minutes, and then each coin half-cell was discharged at a constant current of 0.2 C until the voltage reached 3.0 V.

At the 5$^{th}$ cycle, each coin half-cell was charged at a constant current of 0.2 C and a constant voltage of 4.3 V, the charging process was cut off at 0.05 C, followed by resting for 10 minutes, and then each coin half-cell was discharged at a constant current of 0.33 C until the voltage reached 3.0 V.

At the 6$^{th}$ cycle, each coin half-cell was charged at a constant current of 0.2 C and a constant voltage of 4.3 V, the charging process was cut off at 0.05 C, followed by resting for 10 minutes, and then each coin half-cell was discharged at a constant current of 0.5 C until the voltage reached 3.0 V.

At the 7$^{th}$ cycle, each coin half-cell was charged at a constant current of 0.2 C and a constant voltage of 4.3 V, the charging process was cut off at 0.05 C, followed by resting for 10 minutes, and then each coin half-cell was discharged at a constant current of 1.0 C until the voltage reached 3.0 V.

At the 8$^{th}$ cycle, each coin half-cell was charged at a constant current of 0.2 C and a constant voltage of 4.3 V, the charging process was cut off at 0.05 C, followed by resting for 10 minutes, and then each coin half-cell was discharged at a constant current of 2.0 C until the voltage reached 3.0 V.

At the 9$^{th}$ cycle, each coin half-cell was charged at a constant current of 0.2 C and a constant voltage of 4.3 V, the charging process was cut off at 0.05 C, followed by resting for 10 minutes, and then each coin half-cell was discharged at a constant current of 3.0 C until the voltage reached 3.0 V.

The rate capability of each coin half-cell was calculated using Equation 3 below.

Rate discharge capability (%)=[discharge capacity at 1 C/discharge capacity at 0.1 C]×100   Equation 3

Some of the results of discharge capacity and high rate capability at each cycle are shown in Table 6 below.

TABLE 6

| | 0.2 C [mAh/g] | 0.5 C [mAh/g] | 1.0 C [mAh/g] | Rate capability [%] |
|---|---|---|---|---|
| Manufacture Example 1 | 195.8 | 190.8 | 185.4 | 93.4 |
| Comparative Manufacture Example 1 | 194.4 | 187.4 | 180.4 | 91.7 |
| Comparative Manufacture Example 2 | 183.7 | 177.8 | 170.2 | 91.1 |
| Comparative Manufacture Example 3 | 194.7 | 187.9 | 180.9 | 91.5 |

Referring to Table 6, the coin half-cell of Manufacture Example 1 exhibited enhanced discharge capacity and enhanced rate capability, as compared to those of the coin half-cells of Comparative Manufacture Examples 1 to 3.

As is apparent from the foregoing description, by using a nickel-based active material precursor for a lithium secondary battery, according to embodiments of the present disclosure, a nickel-based active material in which deterioration due to cation mixing is suppressed or reduced and structural stability is enhanced may be obtained. A lithium secondary battery using such nickel-based active material as a positive active material exhibits enhanced capacity and enhanced lifespan characteristics.

As used herein, the terms "use," "using," and "used" may be considered synonymous with the terms "utilize," "utilizing," and "utilized," respectively.

In addition, the terms "substantially," "about," and similar terms are used as terms of approximation and not as terms of degree, and are intended to account for the inherent deviations in measured or calculated values that would be recognized by those of ordinary skill in the art.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the present disclosure as defined by the following claims and their equivalents.

What is claimed is:

1. A nickel-based active material precursor for a lithium secondary battery, the nickel-based active material precursor comprising:
   a particulate structure comprising:
      a core portion,
      an intermediate layer portion on the core portion, and
      a shell portion on the intermediate layer portion,
   wherein the nickel-based active material precursor comprises nickel (Ni),
   wherein each of the core portion and the intermediate layer portion comprises a cation or anion different from that of the shell portion,
   wherein the cation comprises at least one selected from boron (B), magnesium (Mg), calcium (Ca), strontium (Sr), barium (Ba), titanium (Ti), vanadium (V), tungsten (W), chromium (Cr), iron (Fe), copper (Cu), zirconium (Zr), and aluminum (Al), and/or the anion comprises at least one selected from phosphate ($PO_4$), $BO_2$, $B_4O_7$, $B_3O_5$, and F, and
   wherein the shell portion comprises open pores extending from inside of the nickel-based active material precursor to a surface of the nickel-based active material precursor.

2. The nickel-based active material precursor of claim 1, wherein the intermediate layer portion comprises primary particles radially arranged on the core portion.

3. The nickel-based active material precursor of claim 1, wherein the shell portion comprises primary particles radially arranged on the core portion and the intermediate layer portion.

4. The nickel-based active material precursor of claim 1, wherein the particulate structure of the nickel-based active material precursor is a single particulate structure.

5. The nickel-based active material precursor of claim 1, wherein the shell portion comprises at least one cation selected from B, Mg, Ca, Sr, Ba, Ti, V, W, Cr, Fe, Cu, Zr, and Al.

6. The nickel-based active material precursor of claim 5, wherein a content of the cation is 0.9 mol % or less with respect to a total amount of the nickel-based active material precursor.

7. The nickel-based active material precursor of claim 1, wherein the core portion and the intermediate layer portion comprise at least one anion selected from phosphate ($PO_4$), $BO_2$, $B_4O_7$, $B_3O_5$, and F.

8. The nickel-based active material precursor of claim 7, wherein a content of the anion is 0.06 mol % or less with respect to a total amount of the nickel-based active material precursor.

9. The nickel-based active material precursor of claim 1, wherein the intermediate layer portion and the shell portion are each lower in porosity than the core portion, or the core portion and the shell portion are each higher in porosity than the intermediate layer portion.

10. The nickel-based active material precursor of claim 1, wherein the nickel-based active material precursor has a mean particle diameter of about 9 μm to about 20 μm.

11. The nickel-based active material precursor of claim 1, wherein the nickel-based active material precursor comprises plate particles, and wherein major axes of the plate particles are radially arranged.

12. The nickel-based active material precursor of claim 1, wherein the nickel-based active material precursor is a compound represented by Formula 1 or Formula 2:

$$Ni_{1-x-y-z}Co_xMn_yM_z(OH)_{2-\alpha}X_\alpha, \quad \text{Formula 1}$$

$$Ni_{1-x-y-z}Co_xAl_yM_z(OH)_{2-\alpha}X_\alpha, \quad \text{Formula 2}$$

wherein, in Formulae 1 and 2, M is at least one element selected from B, Mg, Ca, Sr, Ba, Ti, V, W, Cr, Fe, Cu, Zr, and Al, X is at least one selected from $PO_4$, $BO_2$, $B_4O_7$, $B_3O_5$, and F, $x \leq (1-x-y-z)$, $y \leq (1-x-y-z)$, $0<x<1$, $0 \leq y<1$, $0<z \leq 0.01$, and $0<\alpha \leq 0.01$.

13. The nickel-based active material precursor of claim 12, wherein a content of nickel in the nickel-based active material precursor is in a range of about 33 mol % to about 97 mol % with respect to a total amount of transition metals, and is higher than a content of manganese or aluminium and a content of cobalt.

14. The nickel-based active material precursor of claim 1, wherein the nickel-based active material precursor is one selected from $(Ni_{0.6}Co_{0.2}Mn_{0.2})_{1-a}M_a(OH)_{2-\alpha}X_\alpha$, $(Ni_{0.5}Co_{0.2}Mn_{0.3})_{1-a}M_a(OH)_{2-\alpha}X_\alpha$, $(Ni_{0.7}Co_{0.15}Mn_{0.15})_{1-a}M_a(OH)_{2-\alpha}X_\alpha$, $(Ni_{0.85}Co_{0.1}Al_{0.05})_{1-a}M_a(OH)_{2-\alpha}X_\alpha$, and $(Ni_{0.91}Co_{0.06}Mn_{0.03})_{1-a}M_a(OH)_{2-\alpha}X_\alpha$, wherein $0<a<0.01$ and $0<\alpha \leq 0.01$, M is at least one element selected from B, Mg, Ca, Sr, Ba, Ti, V, W, Cr, Fe, Cu, Zr, and Al, and X is at least one selected from $PO_4$, $BO_2$, $B_4O_7$, $B_3O_5$, and F.

* * * * *